(12) United States Patent
Miller

(10) Patent No.: US 12,265,458 B1
(45) Date of Patent: Apr. 1, 2025

(54) METHOD AND PRESERVATION REQUIREMENTS USING A DUAL PREDICTOR ARCHITECTURE

(71) Applicant: Ram Pavement, Charlotte, NC (US)

(72) Inventor: Rob Miller, Charlotte, NC (US)

(73) Assignee: RAM Pavement Services, Inc., Charlotte, NC (US)

(*) Notice: Subject to any disclaimer, the term of this patent is extended or adjusted under 35 U.S.C. 154(b) by 0 days.

(21) Appl. No.: 18/375,669

(22) Filed: Oct. 2, 2023

(51) Int. Cl.
*G06F 11/28* (2006.01)
*G06N 20/00* (2019.01)

(52) U.S. Cl.
CPC ............. *G06F 11/28* (2013.01); *G06N 20/00* (2019.01)

(58) Field of Classification Search
CPC ................................ G06N 20/00; G06F 11/28
See application file for complete search history.

(56) References Cited

U.S. PATENT DOCUMENTS

| | | | |
|---|---|---|---|
| 10,453,146 B1 | 10/2019 | Stricker | |
| 2006/0041459 A1 | 2/2006 | Hester | |
| 2012/0041903 A1* | 2/2012 | Beilby | H04L 51/02 706/11 |
| 2012/0221371 A1* | 8/2012 | Hegazy | G06Q 50/16 705/7.25 |
| 2021/0142464 A1* | 5/2021 | Tian | G06T 7/0004 |

FOREIGN PATENT DOCUMENTS

JP 2002140446 A 5/2002

OTHER PUBLICATIONS

Li, Li, et al. "Use of Markov chain model based on actual repair status to predict bridge deterioration in Shanghai, China." Transportation Research Record 2550.1 (2016): 106-114. (Year: 2016).*

* cited by examiner

*Primary Examiner* — Kevin W Figueroa
(74) *Attorney, Agent, or Firm* — Caldwell Intellectual Property Law

(57) ABSTRACT

An apparatus and method for analysis of preservation requirements using a dual-predictor architecture, wherein the apparatus includes a processor and memory communicatively connected to the at least a processor, the memory containing instructions configuring the at least a processor receive a sustainment profile, identify at least a preservation need as a function of a deterioration predictor, wherein the deterioration predictor is configured to output a plurality of rates corresponding to a plurality of physical process variables, determine at least a relative advantage of a maintenance program as a function of an advantage predictor, wherein the advantage predictor is configured to receive the preservation need as input and output the maintenance program and the relative advantage, and display, through a graphical user interface, the at least a preservation need and relative advantage.

20 Claims, 8 Drawing Sheets

METHOD AND PRESERVATION REQUIREMENTS USING A DUAL PREDICTOR ARCHITECTURE

FIELD OF THE INVENTION

The present invention generally relates to the field of machine-learning. In particular, the present invention is directed to analysis of preservation requirements using a dual-predictor architecture.

BACKGROUND

Predicting the occurrence and rate of physical processes and developing preservation plans to combat the physical processes can be challenging due to the variety of variables involved. Existing solutions do not allow for acceptable accuracy in predicting the physical processes.

SUMMARY OF THE DISCLOSURE

In an aspect, an apparatus for analysis of preservation requirements using a dual-predictor architecture is disclosed. The apparatus includes a processor and memory communicatively connected to the at least a processor, the memory containing instructions configuring the at least a processor receive a sustainment profile, identify at least a preservation need as a function of a deterioration predictor, wherein the deterioration predictor is configured to output a plurality of rates corresponding to a plurality of physical process variables, determine at least a relative advantage of a maintenance program as a function of an advantage predictor, wherein the advantage predictor is configured to receive the preservation need as input and output the maintenance program and the relative advantage, and display, through a graphical user interface, the at least a preservation need and relative advantage.

In another aspect, a method for analysis of preservation requirements using a dual-predictor architecture is disclosed. The method includes receiving, using at least a processor, a sustainment profile, identifying, by the at least a processor, at least a preservation need as a function of a deterioration predictor, wherein the deterioration predictor is configured to output a plurality of rates corresponding to a plurality of physical process variables, determining, by the at least a processor, at least a relative advantage of a maintenance program as a function of an advantage predictor, wherein the advantage predictor is configured to receive the preservation need as input and output the maintenance program and the relative advantage, and displaying, by the at least a processor, through a graphical user interface, the at least a preservation need and relative advantage.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to an apparatus for analysis of preservation requirements using a dual-predictor architecture. The apparatus includes at least a processor configured to receive a sustainment profile, identify the associated preservation needs, generate a prioritized maintenance program based on the identified preservation needs, and analyze implications of the generated maintenance program, wherein the maintenance program includes a relative advantage.

In another aspect, a method for analysis of preservation requirements using a dual-predictor architecture. is disclosed. The method includes receiving, by the at least a processor, a sustainment profile, identifying, by the at least a processor, preservation needs, generating, by the at least a processor, a prioritized maintenance program based on the preservation needs, wherein the maintenance program includes a relative advantage.

In an embodiment, the disclosed description may be applied to a driveway maintenance evaluation and implementation. Aspects of the present disclosure can be used in non-driveway applications, such as the maintenance of an automobile engine, or a specific piece of an engine (e.g. spark plugs, oil filter, rotors, brake pads, etc.), landscaping, roof repair, home construction, heating, ventilation and air-conditioning systems, etc. With sufficient training data, or a method to enable training data, the described apparatus and method may be applied to any system or operation wherein a maintenance program is necessary or helpful.

Figure 1:
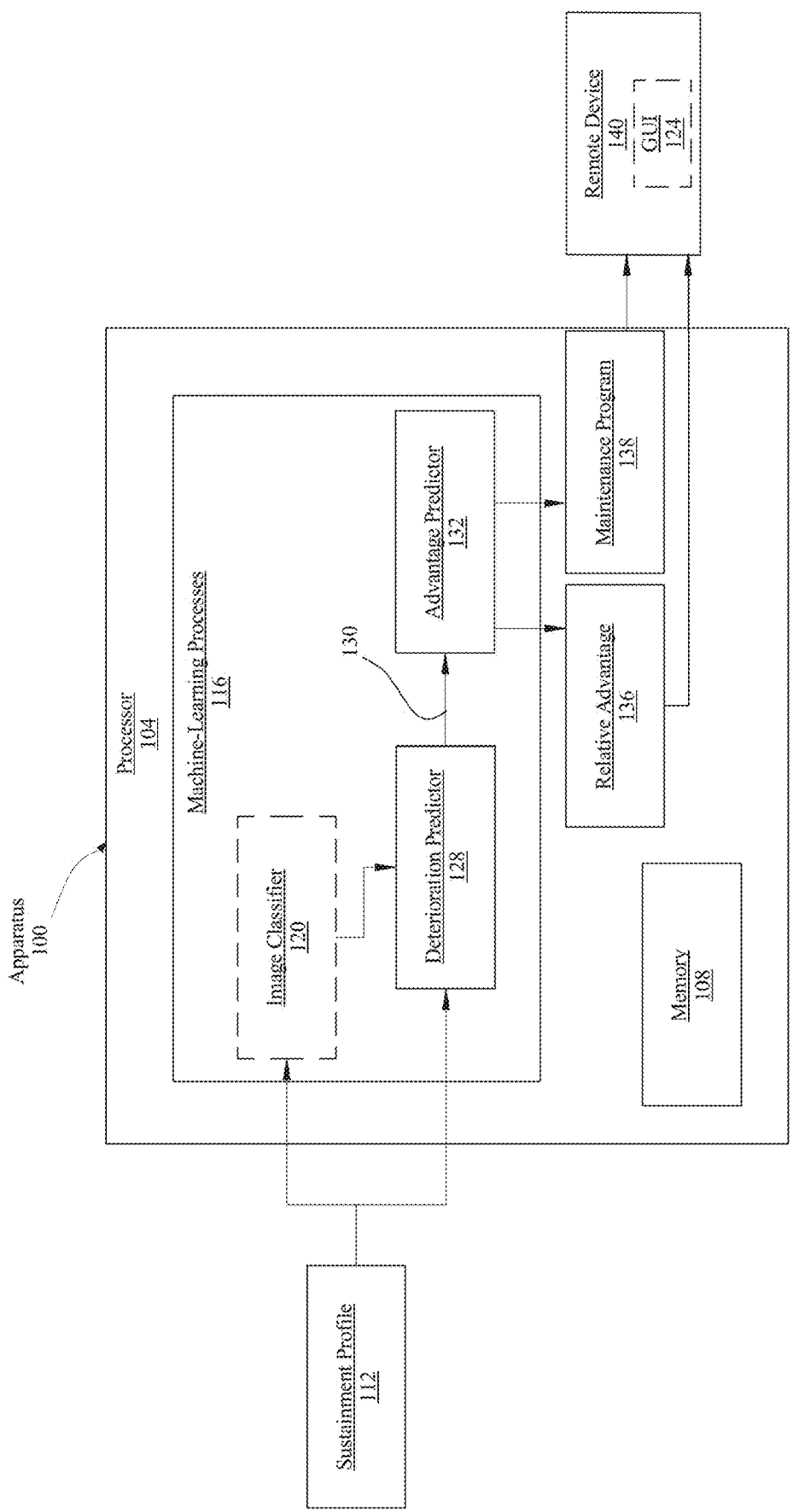
FIG. 1 is a block diagram of an apparatus for analysis of preservation requirements using a dual-predictor architecture.

Referring now to FIG. 1, an exemplary embodiment of an apparatus 100 for analysis of preservation requirements using a dual-predictor architecture is illustrated. The apparatus 100 includes a computing device. The computing device includes a processor 104, which is communicatively connected to and configured by a memory 108. Apparatus 100 may include any computing device as described in this disclosure, including without limitation a microcontroller, microprocessor, digital signal processor (DSP) and/or system on a chip (SoC) as described in this disclosure. Apparatus 100 may include, be included in, and/or communicate with a mobile device such as a mobile telephone or smartphone. Apparatus 100 may include a single computing device operating independently, or may include two or more computing device operating in concert, in parallel, sequentially or the like; two or more computing devices may be included together in a single computing device or in two or more computing devices. Apparatus 100 may interface or communicate with one or more additional devices as described below in further detail via a network interface device. Network interface device may be utilized for connecting apparatus 100 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Apparatus 100 may include but is not limited to, for example, a computing device or cluster of computing devices in a first location and a second computing device or cluster of computing devices in a second location. Apparatus 100 may include one or more computing devices dedicated to data storage, security, distribution of traffic for load balancing, and the like. Apparatus 100 may distribute one or more computing tasks as described below across a plurality of computing devices of computing device, which may operate in parallel, in series, redundantly, or in any other manner used for distribution of tasks or memory between computing devices. Apparatus 100 may be implemented, as a non-limiting example, using a "shared nothing" architecture.

With continued reference to FIG. 1, processor 104 may be designed and/or configured to perform any method, method step, or sequence of method steps in any embodiment described in this disclosure, in any order and with any degree of repetition. For instance, processor 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Processor 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Still referring to FIG. 1, processor 104 is configured to receive a sustainment profile 112. As used herein, a "sustainment profile" refers to a set of information including at least a maintenance engagement datum. The profile may be collected through an interface wherein the questions and answers are formatted to invoke consistent properties, but enable specific details to diverge from the standardized inputs when user deems it necessary. This sustainment profile 112 may accept multiple formats of inputs including multiple choice answers, short answer responses, photographic images, and handwritten documents. The various forms of submissions making up the sustainment profile 112 are ingested and processed by machine-learning processes 116, which are discussed in detail below in reference to FIG. 2. Where the initial sustainment profile 112 contains insufficient information to accurately generate a representative maintenance plan, a chatbot or some other version of user prompt may be initiated to gather the remaining necessary information. Processor 104 may be configured to interface with the user using a chatbot to collect the required data, as determined by a decision tree progression. The decision tree may contain a branch for each primary category of maintenance types, then contain sub-branches for more narrowly tailored engagements within each maintenance type categories. At the termination of each narrowly tailored sub-branch, a minimum set of input criteria may be applied to identify the critical information necessary to conduct the subsequent maintenance program development as discussed below. Based on the identified critical information, processor 104 may then prompt the user to provide any missing critical information. User's response to this prompt may then be used to fully populate the sustainment profile 112. The chatbot interface may be engaged from the outset and enable the complete buildout of the sustainment profile 112, or any subordinate portion of it. Chatbot operations are discussed in detail below in reference to FIG. 3.

Still referring to FIG. 1, processor 104 may be configured to receive a set of standardized parameters through a restricted entry mechanism. These restricted entries made by the user may initially be confined to multiple choice or binary yes/no entries, then transition to short answers before engaging in image submissions and extended literary entries. In a non-limiting embodiment, user may be prompted to initially select from a type of engagement wherein the options may describe equipment, construction, landscaping, as well as any other categorization method deemed most effective by the user and/or machine-learning processes 116. Upon identifying the category of engagement, machine-learning processes 116 may then narrow the queries to the specific information needed to develop an optimal maintenance plan. Continuing the prior non-limiting embodiment, wherein user selects construction, processor 104 may then prompt for further identification of a specific construction type including options such as roofing, pools, driveways, gutters, etc. In a non-limiting embodiment, user may select driveway as well as any further specifying prompts presented. Once the appropriate category of maintenance type is identified, specific details may be uploaded to develop the more intricate details of a personalized maintenance plan. As used herein, "standardized parameters" refers to a limited set of options in inputting details or answering prompts. In a non-limiting embodiment, standardized parameters for a type of driveway may consist of concrete, asphalt, gravel, or tamped dirt. In some scenarios, processor 104 may enable subsets of standardized parameters within these initial categories where necessary to ensure an optimally suitable plan.

Still referring to FIG. 1, processor 104 may be configured to receive a plurality of uploaded images. The uploaded images may be required to conform to a standard format image set of requirements. As used herein, "standard format image" refers to an uploaded image which is restricted to a preferred angle, lighting, distance, and clarity based on the type of engagement, or further details provided by the user. Requiring this type of standardized image may enable more effective use of training data and machine-learning.

With continued reference to FIG. 1, sustainment profile 112 may include at least a geographic datum. A "geographic datum," for the purposes of this disclosure, is a datum regarding the geographic location of one or more objects in a sustainment profile. As a non-limiting example, geographic datum may include one or more sets of coordinates of the location of a project location. As a non-limiting example, geographic datum may include a plurality of coordinates, wherein the plurality of coordinates denote a boundary of a project area. In some embodiments, geographic datum may include address data. Address data may include any information contained in a mailing address. Address data may include a street and house number, apartment number, city, state, zip code, country, and the like.

With continued reference to FIG. 1, in some embodiments, geographic datum may be determined by processor 104 and/or a remote device, using GPS technology. In some embodiments, processor 104 may receive a geographic datum from a remote device.

With continued reference to FIG. 1, in some embodiments, sustainment profile 112 may include a material type. "Material type," for the purposes of this disclosure, is a datum regarding material of a project. Mateirla type, as non-limiting examples, may include asphalt, concrete, sealant, plastic, wood, metal, and the like. In some embodiments, sustainment profile 112 may include a material amount associated with a material type. As a non-limiting example, sustainment profile may include 100 sq. ft. of asphalt and 50 sq. ft. of concrete.

With continued reference to FIG. 1, sustainment profile 112 may include a topographical datum. A "topographical datum" is a datum regarding the relative height of a point in space. In some embodiments, topographical datum may include a plurality of data points regarding the height of various locations of a project area. In some embodiments, plurality of data points may be arranged at regular intervals, such as in a grid. In some embodiments, topographical datum may include slope information. "Slope information," for the purposes of this disclosure, refers to information regarding the relative height of a point in space relative to one or more surrounding points.

With continued reference to FIG. 1, sustainment profile 112 may include weather data. Weather data may include, as non-limiting examples, information regarding freeze-thaw cycle, average temperatures, average low temperatures, average high temperatures, temperature data, rain data, snow data, sleet data, plowing data, and the like. In some embodiments, processor 104 may be configured to retrieve weather data using a geographic datum. In some embodiments, processor 104, may use a weather API to retrieve weather data using a geographic datum.

With continued reference to FIG. 1, in some embodiments, sustainment profile may include landscaping data. Landscaping data may include data regarding flora within a project site. In some embodiments, landscaping data may include associated location data for elements of flora within a project site. In some embodiments, landscaping data may include root data for flora.

Still referring to FIG. 1, in some embodiments, sustainment profile 112 may include handwritten, pixelated, or poorly printed documents previously scanned in but not machine-readable. In some embodiments, sustainment profile 112 may include non-machine-readable documents. These types of documents of sustainment profile 112 may rely on optical character recognition or optical character reader (OCR), executed by processor 104 to automatically convert images of written (e.g., typed, handwritten or printed text) into machine-encoded text. In some cases, recognition of at least a keyword from an image component may include one or more processes, including without limitation optical character recognition (OCR), optical word recognition, intelligent character recognition, intelligent word recognition, and the like. In some cases, OCR may recognize written text, one glyph or character at a time. In some cases, optical word recognition may recognize written text, one word at a time, for example, for languages that use a space as a word divider. In some cases, intelligent character recognition (ICR) may recognize written text one glyph or character at a time, for instance by employing machine learning processes. In some cases, intelligent word recognition (IWR) may recognize written text, one word at a time, for instance by employing machine learning processes.

Still referring to FIG. 1, in some cases OCR may be an "offline" process, which analyses a static document or image frame. In some cases, handwriting movement analysis can be used as input to handwriting recognition. For example, instead of merely using shapes of glyphs and words, this technique may capture motions, such as the order in which segments are drawn, the direction, and the pattern of putting the pen down and lifting it. This additional information can make handwriting recognition more accurate. In some cases, this technology may be referred to as "online" character recognition, dynamic character recognition, real-time character recognition, and intelligent character recognition.

Still referring to FIG. 1, in some cases, OCR processes may employ pre-processing of image component. Pre-processing process may include without limitation de-skew, de-speckle, binarization, line removal, layout analysis or "zoning," line and word detection, script recognition, character isolation or "segmentation," and normalization. In some cases, a de-skew process May include applying a transform (e.g., homography or affine transform) to image component to align text. In some cases, a de-speckle process may include removing positive and negative spots and/or smoothing edges. In some cases, a binarization process may include converting an image from color or greyscale to black-and-white (i.e., a binary image). Binarization may be performed as a simple way of separating text (or any other desired image component) from a background of image component. In some cases, binarization may be required for example if an employed OCR algorithm only works on binary images. In some cases, a line removal process may include removal of non-glyph or non-character imagery (e.g., boxes and lines). In some cases, a layout analysis or "zoning" process may identify columns, paragraphs, captions, and the like as distinct blocks. In some cases, a line and word detection process may establish a baseline for word and character shapes and separate words, if necessary. In some cases, a script recognition process may, for example in multilingual documents, identify script allowing an appropriate OCR algorithm to be selected. In some cases, a character isolation or "segmentation" process may separate signal characters, for example character-based OCR algorithms. In some cases, a normalization process may normalize aspect ratio and/or scale of image component.

Still referring to FIG. 1, in some embodiments an OCR process will include an OCR algorithm. Exemplary OCR algorithms include matrix matching process and/or feature extraction processes. Matrix matching may involve comparing an image to a stored glyph on a pixel-by-pixel basis. In some case, matrix matching may also be known as "pattern matching," "pattern recognition," and/or "image correlation." Matrix matching may rely on an input glyph being correctly isolated from the rest of the image component. Matrix matching may also rely on a stored glyph being in a similar font and at a same scale as input glyph. Matrix matching may work best with typewritten text.

Still referring to FIG. 1, in some embodiments, an OCR process may include a feature extraction process. In some cases, feature extraction may decompose a glyph into features. Exemplary non-limiting features may include corners, edges, lines, closed loops, line direction, line intersections, and the like. In some cases, feature extraction may reduce dimensionality of representation and may make the recognition process computationally more efficient. In some cases, extracted feature can be compared with an abstract vector-like representation of a character, which might reduce to one or more glyph prototypes. General techniques of feature detection in computer vision are applicable to this type of OCR. In some embodiments, machine-learning processes like nearest neighbor classifiers (e.g., k-nearest neighbors algorithm) can be used to compare image features with stored glyph features and choose a nearest match. OCR may employ any machine-learning process described in this disclosure, for example machine-learning processes described with reference to FIG. 2 below. Exemplary non-limiting OCR software includes Cuneiform and Tesseract. Cuneiform is a multi-language, open-source optical character recognition system originally developed by Cognitive Technologies of Moscow, Russia. Tesseract is free OCR software originally developed by Hewlett-Packard of Palo Alto, California, United States.

Still referring to FIG. 1, in some cases, OCR may employ a two-pass approach to character recognition. Second pass may include adaptive recognition and use letter shapes recognized with high confidence on a first pass to recognize better remaining letters on the second pass. In some cases, two-pass approach may be advantageous for unusual fonts or low-quality image components where visual verbal content may be distorted. Another exemplary OCR software tool includes OCRopus. OCRopus development is led by German Research Centre for Artificial Intelligence in Kaiserslautern, Germany. In some cases, OCR software may employ neural networks, for example neural networks as taught in reference to FIGS. 4-5 below.

Still referring to FIG. 1, in some cases, OCR may include post-processing. For example, OCR accuracy can be increased, in some cases, if output is constrained by a lexicon. A lexicon may include a list or set of words that are allowed to occur in a document. In some cases, a lexicon may include, for instance, all the words in the English language, or a more technical lexicon for a specific field. In some cases, an output stream may be a plain text stream or file of characters. In some cases, an OCR process may preserve an original layout of visual verbal content. In some cases, near-neighbor analysis can make use of co-occurrence frequencies to correct errors, by noting that certain words are often seen together. For example, "Washington, D.C." is generally far more common in English than "Washington DOC." In some cases, an OCR process may make us of a priori knowledge of grammar for a language being recognized. For example, grammar rules may be used to help determine if a word is likely to be a verb or a noun. Distance conceptualization may be employed for recognition and classification. For example, a Levenshtein distance algorithm may be used in OCR post-processing to further optimize results.

Still referring to FIG. 1, sustainment profile 112 may require standardized images of the subject of the maintenance plan. In these cases, machine-learning processes 116 may be used to identify the specific attributes relevant to the various degrees of maintenance or complexity. In a non-limiting embodiment, a picture of a subject driveway contained within sustainment profile 112, which was captured from a set lighting, angle, distance, and clarity to allow comparison to a historical database of other subject driveways, may reveal an above-average quantity of cracks or erosion. This historical database of comparable subjects may be contained within memory 108. For example, database may be configured as a structured database with contents organized according to a schema or other logical relationships (e.g., relational database). In some embodiments database may be configured as a non-relational database, a semi-structured database, an unstructured database, a key-value store, or the like. Database may be directly coupled to processor 104 or operate in a variety of other possible arrangements. For example, and without limitation, database may be accessed via a network, or the like. Database may be used to store historic data, prior engagements from the entire user base, any model parameters associated with those prior engagements, or any other data which may be relevant and/or applicable in subsequent applications. Database may be implemented, without limitation, as a relational database, a key-value retrieval database such as a NOSQL database, or any other format or structure for use as a database that a person skilled in the art would recognize as suitable upon review of the entirety of this disclosure. Database may alternatively or additionally be implemented using a distributed data storage protocol and/or data structure, such as a distributed hash table or the like. Database may include a plurality of data entries and/or records as described above. Data entries in a database may be flagged with or linked to one or more additional elements of information, which may be reflected in data entry cells and/or in linked tables such as tables related by one or more indices in a relational database. In a separate non-limiting embodiment, the driveway image may reveal that the initial concrete pour of the driveway was completed in a non-compliant manner causing the driveway to appear to be in decent condition, but actually limiting the lifespan of the driveway to ten years less than that of a compliantly poured concrete driveway. These types of image-based assessments may be conducted by an image classifier 120.

Still referring to FIG. 1, processor 104 may be configured to apply one or more classifier descriptors to individual images within sustainment profile 112, or to sustainment profile 112 as a whole. As used herein, a "classifier descriptor" is a type of data tag which is digitally attached to a picture, engagement, or user profile. Image classifier 120 applies at least a classifier descriptor to each image within sustainment profile 112 such that all subsequent processing within processor 104 may be based on the classifier descriptor(s) rather than any actual image data. The data tags may subsequently be used by processor 104 to execute the requisite analysis and generation functions and build an engagement-specific maintenance plan. In a non-limiting embodiment, a sustainment profile 112 may contain images of an aging driveway, wherein processor 104 may apply classifier descriptors of "driveway", "asphalt", "20-year original age", "crumbling deterioration", "lifetime cost prioritization", etc. There is no maximum limit of the number of classifier descriptors appended to any individual image. Processor 104 may apply a classifier descriptor for each identifiable, relevant characteristic based on the training data available.

Still referring to FIG. 1, image classifier 120 may rely on prior training data executed within machine-learning processes 116 in the form of a subject matter expert inputting pictures then methodically applying classifier descriptors. Image classifier 120 may also exclusively rely on user feedback from the current or prior engagements. In a non-limiting embodiment, a substantial number of users providing feedback that a given sample driveway image shows evidence of significant weather-induced erosion would enable processor 104 to extrapolate the visible characteristics from those images leading to that classification such that subsequent engagements could reliably diagnose a similar weather-induced erosion condition. In this way, image classifier 120 may rely exclusively on individual user assessments for training data. Additionally, image classifier 120 may accept a bulk import of training data consisting of a multitude of examples of maintenance subjects wherein the relevant conditions are already identified and affiliated. Training data of image classifier 120 may include sustainment profiles 116 or images from sustainment profiles correlated to classifier descriptors. In a non-limiting embodiment, a bulk import of substrate-induced cracking in concrete with the cracks properly identified and labeled may be used to train machine-learning processes 116 how to identify substrate-induced cracking in concrete in subsequent engagements. This training data may further be corroborated with human feedback to identify the best examples of identifiable images, such that the controllable properties of these images may be incorporated as the recommended standard for images captured and imported in subsequent engagements. Image classifier 120 may rely on these examples to train the machine-learning processes 116 and establish the same affiliations when similar conditions are presented. Image classifier 120 may identify and append classifier descriptors based on the severity of degradation within sustainment profile 112. In a non-limiting embodiment, an image showing paint chipping may receive be assessed as "negligible", "light", "moderate", "severe", or "extreme" chipping. This assessment may rely on prior paint chipping images and user-validated assessments as training data. Image classifier 120 may output the appended classifier descriptors based on the recognized physical characteristics associated with images, limited to the identified maintenance category related characteristics.

Still referring to FIG. 1, image classifier 120 may transmit all images or videos contained within sustainment profile 112, along with any appended classifier descriptors based on the identified characteristics, to a sustainment classifier. The output of image classifier 120 may additionally include a set of human-readable labels wherein the image is labeled, highlighted, or otherwise annotated showing the specific part of the image that each of the primary classifier descriptors is based upon. The displayed human-readable labels may be limited to only those labels affiliated with properties of sustainment profile 112 which contributed to any chatbot decision tree progression. All classifier descriptors not contributing to chatbot decision tree progression decisions may remain covertly appended to the affiliated portion(s) of sustainment profile 112 for subsequent processing. The human-readable labels selected for display are categorized as such for display by GUI 124.

With continued reference to FIG. 1, in some embodiments, receiving sustainment profile 112 may include receiving a plurality of images including at least a maintenance engagement datum. As used herein, a "maintenance engagement datum" is a datum regarding an item or location that needs maintenance. As non-limiting examples, plurality of images may include representations of potholes, cracks, crumbling material, wearing material, driveways, parking lots, building sites, and the like. In some embodiments, plurality of images may include a plurality of images of a job site.

With continued reference to FIG. 1, in some embodiments, processor 104 may determine a plurality of preservation classifications as a function of the plurality of images. In some embodiments, processor 104 may determine a plurality of preservation classifications using image classifier 120. In some embodiments, image classifier 120 may be configured to receive the plurality of images as input and output a plurality of preservation classifications. For the purposes of this disclosure, a "preservation classification" is a category relating to the preservation of a maintenance engagement datum. In some embodiments, preservation classification may include a damage type, such as crack, pothole, and the like. In some embodiments, preservation classification may include a material type. In some embodiments, processor 104 may assign different preservation classifications to different portions of an image. For example, image processor may determine that a first portion of an image should be assigned a material type of "concrete" whereas a second portion of image should be assigned a material type of "asphalt.

With continued reference to FIG. 1, image classifier 120 may be trained using training data comprising a plurality of images correlated to a plurality of preservation classifications. In some embodiments, training data may include a plurality of images of different materials correlated to associated material types. In some embodiments, training data may include images of damage correlated to preservation classifications relating to the type of damage.

Still referring to FIG. 1, sustainment profile 112 may additionally be generated via the answer to a series of questions. The series of questions may be implemented using a chatbot, as described herein below in reference to FIG. 3. A chatbot may be configured to generate questions regarding the user's maintenance subject including engagement type, material, age, any prior maintenance performed, seasonal weather conditions, physical contact conditions, and the like. In a non-limiting embodiment, the user may be prompted to input specific information or may fill out a questionnaire. In an embodiment, a graphical user interface (GUI) 124 may display a series of questions to prompt a user for information pertaining to sustainment profile 112. A "graphical user interface (GUI)," as used herein, is a graphical form of user interface that allows users to interact with electronic devices. In some embodiments, GUI 124 may include icons, menus, other visual indicators, or representations (graphics), audio indicators such as primary notation, and display information and related user controls. A menu may contain a list of choices and may allow users to select one from them. A menu bar may be displayed horizontally across the screen such as pull-down menu. When any option is clicked in this menu, then the pull-down menu may appear. A menu may include a context menu that appears only when the user performs a specific action. An example of this is pressing the right mouse button. When this is done, a menu may appear under the cursor. Files, programs, web pages and the like may be represented using a small picture in a graphical user interface. For example, links to decentralized platforms as described in this disclosure may be incorporated using icons. Using an icon may be a fast way to open documents, run programs etc. because clicking on them yields instant access. Information contained in user interface may be directly influenced using graphical control elements such as widgets. A "widget," as used herein, is a user control element that allows a user to control and change the appearance of elements in the user interface. In this context a widget may refer to a generic GUI element such as a check box, button, or scroll bar to an instance of that element, or to a customized collection of such elements used for a specific function or application (such as a dialog box for users to customize their computer screen appearances). User interface controls may include software components that a user interacts with through direct manipulation to read or edit information displayed through user interface. Widgets may be used to display lists of related items, navigate the system using links, tabs, and manipulate data using check boxes, radio boxes, and the like. As a further example, chatbot may display a list of possible conditions to the user, from which user may select each applicable condition applicable to the current maintenance subject. In a non-limiting embodiment, processor 104 may receive user selection of a roof subject, in which case processor 104 may query the roof type from a selection of asphalt shingles, metal, ceramic tiles, slate shingles, wood shingles, or other. Based on user selections, processor 104 may further narrow down the applicable conditions. Chatbot operations may be governed by a complex decision tree progression wherein the inputs from a previous decision node determine the next action or prompt until sustainment profile 112 includes the minimal set of information to generate a maintenance program based upon. Sustainment profile 112 may be transmitted to processor 104, such as via a wired or wireless communication, as previously discussed in this disclosure. Sustainment profile 112 may be retrieved from multiple sources including separate instantiations of GUI 124 operated by separate individuals, web searches including searches of a government database for recorded construction information, or from a historic database which may contain information about the subject from a prior engagement. Further explanation of chatbot operations is described herein below and referenced in FIG. 3 below.

Still referring to FIG. 1, processor 104 may be configured to identify a set of user priorities from a standardized set of prioritization methods. As used herein, a "prioritization method" may include lifecycle cost, as much improvement as possible within a specified time or dollar amount, minimal cost to maintain an operational status, maximizing performance/aesthetics, or any other method to align the user's needs to a generated maintenance program. Selection of the prioritization method may modify the periodicity, materials used, timeframe of work, quality, and other recommendations. In a non-limiting embodiment, where user submits a sustainment profile 112 concerning a concrete porch stairway, and through chatbot interfacing user selects a prioritization method of minimal cost to maintain operational status, processor 104 would base subsequent decisions on only recommending costs or effort absolutely necessary to continue safe use of the concrete porch stairway. These types of decisions are thoroughly discussed below.

Still referring to FIG. 1, apparatus 100 includes a deterioration predictor 128. apparatus 100 is configured to identify at least a preservation need 130 as a function of deterioration predicator 128. Deterioration predictor 128 is configured to output a plurality of rates corresponding to a plurality of physical process variables. For the purposes of this disclosure, "deterioration predictor" is a machine-learning model that is configured to predict the deterioration of an asset within a sustainment profile. A "physical process variable," for the purposes of this disclosure, is a variable that represents a physical process. For the purposes of this disclosure, a "physical process" is a process that alters the physical properties of an object on which it acts. As non-limiting examples, physical processes may include abrasion, expansion, contraction, wear, and the like.

With continued reference to FIG. 1, in some embodiments, deterioration predictor 128 may include a machine-learning model configured to receive a sustainment profile 112 as input and output a plurality of rates corresponding to physical process variables. In some embodiments, deterioration predictor 128 may be trained using deterioration training data. Deterioration training data may be retrieved from a database. Database may be implemented, without limitation, as a relational database, a key-value retrieval database such as a NOSQL database, or any other format or structure for use as a database that a person skilled in the art would recognize as suitable upon review of the entirety of this disclosure. Database may alternatively or additionally be implemented using a distributed data storage protocol and/or data structure, such as a distributed hash table or the like. Database may include a plurality of data entries and/or records as described above. Data entries in a database may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in a database may store, retrieve, organize, and/or reflect data and/or records as used herein, as well as categories and/or populations of data consistently with this disclosure. Deterioration training data may include a plurality of sustainment profiles correlated to a plurality of rates corresponding to physical process variables. In some embodiments, deterioration training data may include any sub-component of a sustainment profile correlated to one or more rates.

With continued reference to FIG. 1, deterioration predicator 128 may be configured to simulate a deterioration process as a function of the one or more rates. As a non-limiting example, deterioration predictor 128 may forecast an abrasion using an abrasion rate. As a non-limiting example, deterioration predictor 128 may forecast an cracking using a cracking rate. As a non-limiting example, deterioration predictor 128 may forecast an weather-related deterioration using a weather-related deterioration rate.

With continued reference to FIG. 1, deterioration predictor 128 may determine the preservation need by forecasting deterioration process and determining when a component in sustainment profile falls below a threshold value. In some embodiments, threshold values may be associated with certain components, such as "driveway," "wall," "parking lot," "loading dock," concrete," "asphalt," and the like. In some embodiments, threshold values may be associated with certain physical processes as described above. In some embodiments, threshold values may be retrieved from a database. As a non-limiting example, if the deterioration process indicates that "sealant" falls below a threshold value, then preservation need may be "sealant."

With continued reference to FIG. 1, in some embodiments, deterioration predictor 128 may determine rates using a lookup table. For the purposes of this disclosure, a "lookup table" is an array that replaces runtime computation with an array indexing operation. In some embodiments, rates may be associated in lookup table with elements of sustainment profile. As a non-limiting example, a particular material type may be associated with rates in lookup table. As a non-limiting example, a loading may be associated with rates in lookup table. As a non-limiting example, a geographic datum may be associated with rates in lookup table. As a non-limiting example, a weather datum may be associated with rates in lookup table.

With continued reference to FIG. 1, in some embodiments, deterioration predictor 128 may be configured to receive sustainment profile 112 including geographic datum as input and output plurality of rates. In some embodiments, this may include looking up geographic datum in a look up table. In some embodiments, this may include inputting sustainment profile 112 including geographic datum into a machine-learning model, as described above, and receiving as output plurality of rates. In some embodiments, deterioration predictor 128 may be configured to receive sustainment profile 112 including material type as input and output plurality of rates. In some embodiments, this may include looking up material type in a look up table. In some embodiments, this may include inputting sustainment profile 112 including material type into a machine-learning model, as described above, and receiving as output plurality of rates.

With continued reference to FIG. 1, deterioration predictor may be trained using user feedback. As a non-limiting example, in some embodiments, if user feedback indicates that an output of predictor was "bad," then that output and the corresponding input may be removed from training data used to train classifier, and/or may be replaced with a value entered by, e.g., another user that represents an ideal output given the input the classifier originally received, permitting use in retraining, and adding to training data; in either case, classifier may be retrained with modified training data as described in further detail below. In some embodiments, training data of classifier may include user feedback.

With continued reference to FIG. 1, in some embodiments, an accuracy score may be calculated for classifier using user feedback. For the purposes of this disclosure, "accuracy score," is a numerical value concerning the accuracy of a machine-learning model. For example, a plurality of user feedback scores may be averaged to determine an accuracy score. In some embodiments, a cohort accuracy score may be determined for particular cohorts of persons. For example, user feedback for users belonging to a particular cohort of persons may be averaged together to determine the cohort accuracy score for that particular cohort of persons, and used as described above. Accuracy score or another score as described above may indicate a degree of retraining needed for a machine-learning model such as a classifier; computing device 104 may perform a larger number of retraining cycles for a higher number (or lower number, depending on a numerical interpretation used), and/or may collect more training data for such retraining, perform more training cycles, apply a more stringent convergence test such as a test requiring a lower mean squared error, and/or indicate to a user and/or operator that additional training data is needed.

In some embodiments, a sustainment classifier may be configured to assign one or more labels to sustainment profile 112. These labels may be used as input to deterioration predictor 128, described above. Sustainment classifier may accept sustainment profile 112 and, optionally, image classifier 120 outputs as inputs. Sustainment classifier, using machine-learning processes 116, may append additional labels to sustainment profile 112 separate and in addition to those applied by image classifier 120. Application of labels by sustainment classifier may apply to any or all individual features within sustainment profile 112, or a classifier descriptor may be associated with subsets of features or characteristics. In a non-limiting embodiment, a sustainment profile 112 may address a single family household roof, wherein the user has identified all of the physical attributes separately. Sustainment classifier, continuing in the non-limiting embodiment, may apply classifier descriptors consisting of "roof", "single household", "60-degree", "high complexity", "multi-gabel", "priority-lifecycle cost", "double-layered, asphalt shingle", "minor deterioration", "high heat and sunlight exposure", as well as any other set of conditions able to be captured within sustainment profile 112 and relevant to the generation of a maintenance program. Both image classifier 120 and sustainment classifier may rely on fuzzy set comparison to identify the appropriate classifier descriptor uses. In a non-limiting embodiment, machine-learning processes 116 may apply vector representations of each descriptor and to each individual part of a sustainment profile 112, wherein the vector representations consisting of both a scalar quantity and a directional characteristic may then be compared against a set threshold to assess the appropriate application of classifier descriptors. Fuzzy set comparisons are discussed in detail below in reference to FIG. 6.

Still referring to FIG. 1, the output of sustainment classifier may include the full sustainment profile 112 along with any appended labels as described above. These labels may enable the generation of a uniquely applicable maintenance program. In the same way as training image classifier 120, sustainment classifier may also rely on individual user feedback within the current or historic user engagements, as well as any bulk imports of artificial or real sustainment profiles 112 with properly appended labels. Training data for sustainment classifier may include sustainment profiles, or portions thereof, correlated to labels. These examples of training data may teach sustainment classifier which labels are appropriate based on past usage of the labels, wherein machine-learning processes 116 learn the specific features and characteristics displayed within the prior sustainment profiles 112 to warrant the specific application of labels. Sustainment classifier may then replicate those same affiliations in subsequent classification operations.

Still referring to FIG. 1, preservation needs 130 may additionally apply to a landscape, driveway, specified piece of equipment, or other application wherein some kind of standard maintenance plan is generally accepted. The prioritization and programming of a set of corrective and/or preventative actions to comply with the user priorities may use machine-learning processes to identify the set of steps applicable to the unique sustainment profile 112 based on proprietary maintenance programs, historical records, and otherwise publicly available information. In a separate non-limiting embodiment, wherein sustainment profile 112 identifies a 1953 Ford Jubilee tractor, maintenance program generator may recommend a full changeout of all rubber gaskets determined by user's selection of no significant maintenance done within the last 12 years, and a specific lubricant to be applied on reinstall based on lubricant's known properties of old engine conservation and cleaning. This identification of the preservation needs 130 may use machine-learning processes 116 to assess the severity of degradation and the corrective actions required based on image, text and selectable option inputs. Processor 104 may be configured to use machine-learning processes to identify a set of steps based on the classified sustainment profile and a decision tree progression to identify a best fit candidate model. This identification of the appropriate set of steps may be based on a decision tree progression which first isolates the general type of engagement, then identifies the more specific details such as material type, degradation type and severity, prioritization, schedule, and cost preferences, all leading processor 104 to an identifiable candidate model which has an affiliated exemplary maintenance program. Any recognized deviations (e.g. differences between sustainment profile 112 and the identified candidate model) may cause processor 104 to modify the exemplary maintenance program in a predefined manner to optimize the generated maintenance program. Continuing in this embodiment, maintenance program generator may initially identify an "antique tractor" candidate model to baseline a maintenance plan from, then apply unique modifications based on the user's specified conditions. As described, this may include a specific approach to the rubber gaskets if user assesses that they have not been changed out within the most recent decade. Similarly, maintenance program generator may conduct an internet search for a manufacturer's maintenance program from a reliable source as determined by training data and user feedback. Maintenance program generator may then rely on the manufacturer's recommended maintenance exclusively, or as an auxiliary source to augment the candidate model's proposed maintenance. Maintenance program generator may rely on fuzzy set comparisons to identify the appropriate candidate model or other analysis. In a non-limiting embodiment, the compilation of individual vector representations applied based on the classifier descriptors from sustainment classifier may be compared to the database of candidate models relied on within maintenance program generator to conduct a quantifiable comparison and assess whether a match above a certain threshold exists between the input consultation and the reference candidate models. This process of fuzzy set matching is discussed in detail below in reference to FIG. 6.

With continued reference to FIG. 1, apparatus 100 includes an advantage predictor 132. processor 104 is configured to determine at least a relative advantage 136 of a maintenance program 138 as a function of advantage predictor 132. "Advantage predictor," for the purposes of this disclosure, is a machine-learning model that is configured to output a relative advantage of a maintenance program. "Relative advantage," for the purposes of this disclosure, is an advantage of a maintenance program compared to not enacting maintenance program. As non-limiting examples, relative advantage may include a cost, a man-hour count, a time span, a business impact, and the like. For the purposes of this disclosure, a "maintenance program," is a series of actions designed to increase longevity of an item from sustainment profile. In some embodiments, maintenance program may include a plurality of actions and timeframes for those actions. In some embodiments, a maintenance program may include a cost for an action. In some embodiments, maintenance program may include a plurality of parameter for a manufacturing device, such as, but not limited to, speed, tolerances, fluid flow, and the like. In some embodiments, parameters for manufacturing devices may include, paths for a robot to follow, paths for a milling tool, depth of milling, rotational speed, material, and the like.

With continued reference to FIG. 1, advantage predictor is configured to receive preservation 130 as input and output relative advantage 136 and maintenance program 138.

With continued reference to FIG. 1, processor 104 may be configured to determine a maintenance program 138. In some embodiments, advantage predictor 132 may include a program machine-learning model. Program machine-learning model may be trained using a machine-learning module as further described with respect to FIG. 2. In some embodiments, program machine-learning model may be trained using program training data. Program training data may be received from a database. Program training data may include a plurality of preservation needs correlated to a plurality of maintenance programs. In some embodiments, program training data may include preservation needs and sustainment profiles correlated to maintenance programs.

With continued reference to FIG. 1, in some embodiments, determining maintenance program 138 may include retrieving maintenance program 138 as a function of preservation need 130. In some embodiments, processor 104 may retrieve maintenance program 138 from a maintenance lookup table. Maintenance lookup table may include a plurality of maintenance programs 138 associated with preservation need 130. As an example, a preservation need of repaving may have an associated maintenance program. As an example, a preservation need of resealing may have an associated maintenance program. In some embodiments, processor 140 may retrieve an initial maintenance program as a function of preservation need 130. In some embodiments, processor 140 may retrieve an initial maintenance program from a maintenance look up table as a function of preservation need 130.

With continued reference to FIG. 1, in some embodiments, processor 104 may be configured to adjust the initial maintenance program as a function a geographic datum. In some embodiments, processor 104 may be configured to adjust the initial maintenance program as a function a material type. In some embodiments, processor 104 may be configured to adjust the initial maintenance program as a function a geographic datum and material type. In some embodiments, geographic datum and/or material type may have one or more associated adjustment factors. An "adjustment factor," for the purposes of this disclosure is a numerical factor representing an adjustment to a maintenance program for a given datum. In some embodiments, values of maintenance program may be multiplied by adjustment factor in order to create an adjusted maintenance program. In some embodiments, wherein multiple adjustment factors apply to a value of maintenance program, adjustment factors may be averaged before multiplication. In some embodiments, adjustment factors be retrieved from a lookup table. Adjustment factors, as non-limiting examples may compensate for increased/decreased material cost, increased/decreased deterioration, increased/decreased employee costs, and the like.

With continued reference to FIG. 1, in some embodiments, advantage predictor 132 may include an advantage machine-learning model. Advantage machine-learning model may be trained using a machine-learning module as further described with respect to FIG. 1, In some embodiments, advantage machine-learning model may be trained using advantage training data. Advantage training data may include maintenance programs correlated to relative advantages. Advantage training data, in some embodiments, may include maintenance programs and sustainment profiles correlate to relative advantages. Advantage training data may be received from a database.

With continued reference to FIG. 1, in some embodiments, advantage predictor 132 may include a plurality of Markov chains. For the purposes of this disclosure, "Markov chain" is a model for describing a sequence of possible events in which the probability of each event depends only on the state attained in the previous event. Events, in some embodiments, may correspond to data found in sustainment profile 112 or preservation needs 130. In some embodiments, advantage predictor 132 includes a plurality of Markov chains, wherein each Markov chain may include a plurality of states and transitions between the plurality of states. Each transition between the plurality of states may include an associated probability. In some embodiments, Markov chains may be generated using a Chain machine-learning model. Chain machine-learning model may be trained using a machine-learning module as disclosed further with respect to FIG. 2. Chain machine-learning model may be trained using chain training data. Chain training data may include preservation needs correlated to a plurality of events and probabilities associated with the events.

With continued reference to FIG. 1, advantage predictor 132 include a Monte Carlo simulation. A "Monte Carlo simulation" may refer to a "Monte Carlo method," "Monte Carlo experiment," and/or executing a "Monte Carlo algorithm." A Monte Carlo simulation is a mathematical technique that may generate variables, numerical values, and the like, for modeling risk, uncertainty, etc. of a certain system using a stochastic simulation process. Monte Carlo simulations may encompass a range of algorithms and mathematical analysis techniques such as Markov Model Monte Carlo (MMMC) simulations, Mckean-Vlasov processes, Monte Carlo localization, among other probabilistic heuristics. As used herein, a Monte Carlo simulation may generate random maintenance programs, wherein each maintenance program may represent a sufficiently good solution to an optimization problem, wherein the solution is a maintenance program represented by a numerical value, 2D polar coordinate, vector, matrix, or the like. Each generated maintenance program may have associated with it a relative advantage 136. And thus, each maintenance program may have a relative advantage 136 to reach a randomly generated maintenance program. Each maintenance program may then have associated with it a "cost" variable, wherein the cost is a numerical value that represents the maintenance program for a driveway. maintenance programs can be plotted and/or mapped as a function of their cost or relative advantage and a machine-learning process may select maintenance programs based on some criterion, for instance the maintenance programs with the most minimized cost or relative advantage, and select those maintenance programs as inputs to subsequent calculations.

A Monte Carlo simulation is a class of computation algorithms used by a machine-learning process that may rely on repeated stochastic sampling to obtain numerical results, for instance generating random spatial locations within a confined space on a map, wherein each spatial location can have a numerical parameter describing it. Monte Carlo simulations may be performed with dynamic systems that may be coupled with an analysis method, for instance an unknown machine relative to worker cost, wherein the worker cost is determined by sampling within the simulation. In non-limiting illustrative examples, a machine-learning process, may accept generated candidate solutions from a Monte Carlo simulation, as described above, and calculate refined maintenance programs to the candidate maintenance programs, wherein the predicted paths may contain numerical results from the simulated maintenance programs. The Monte Carlo simulation may generate many candidate maintenance programs, where a machine-learning process/model may narrow the number of maintenance programs based on timeframe and/or cost from an optimal advantage. Such a machine-learning process may iteratively generate selected maintenance programs based on a criterion, for instance and without limitation, timeframe, wherein when it is time for a maintenance program to be used for purposes of maintenance, a machine-learning process may retrieve a maintenance program.

With continued reference to FIG. 1, the use of deterioration predictor 128 and advantage predictor 132 may allow for increased accuracy in predictions. For example, deterioration predictor 128 and advantage predictor may allow for better optimized maintenance programs with greater relative advantages. In some embodiments, this use of deterioration predictor 128 and advantage predictor 132 may be useful in improving construction, paving services, and automated manufacturing processes.

Still referring to FIG. 1, processor 104 configures GUI 124 comprising the generated maintenance program and any analyzed implications. This display may be provided through a remote device 140. As used herein, a "remote device" is any device communicatively connected to processor 104 and capable of displaying a set of digital information as directed by processor 104. In a non-limiting embodiment, remote device 140 may be a handheld digital device such as a smart mobile phone, a monitor with a wireless, HDMI, or similar connection mechanism, a projector, or any device capable of converting commands from processor 104 to a visible, human-readable context. Remote device 140 may display the GUI 124 as discussed above. Both remote device 140 and GUI 124 displayed information may be modified by the user, machine-learning processes 116, and/or training data from historical engagements. These modifications may include the information displayed, the color scheme, layout, language used, numeric system used (e.g. metric vs. English units, currency, time zone, etc.), or any other similar variation in the manner of display. Remote device 140 may use machine-learning processes 116 to dynamically modify GUI 124 based on training data and user inputs. In a non-limiting embodiment, a standard driveway maintenance plan may display the steps over a displayed timeline. But in some circumstances, processor 104 may assess that a single specific portion of the engagement is the primary cost/performance driver such that the single factor may be prioritized in the display. For an example of this type of scenario, a user may wish to develop a driveway maintenance program, but the subject driveway's primary deterioration mechanism is the chipping away of the driveway's curb by snow plows every winter. In this engagement, processor 116 may recognize this as the primary cost driver and recommend a reconfiguration of the curb transition to reduce the exposed slopes to any snow plows along with a standard maintenance plan. In this engagement, the reconfiguration is the primary cost driver and would reasonably be the focal point for a user decision, thereby warranting the focus by GUI 124 and/or remote device 140.

Still referring to FIG. 1, processor 104 is configured to display the identified at least a preservation need 130, relative advantage 136, and/or maintenance program 138. As described above, this display may be modified manually by the user, or by machine-learning processes 116 as based on training data from prior user feedback.

Figure 2:
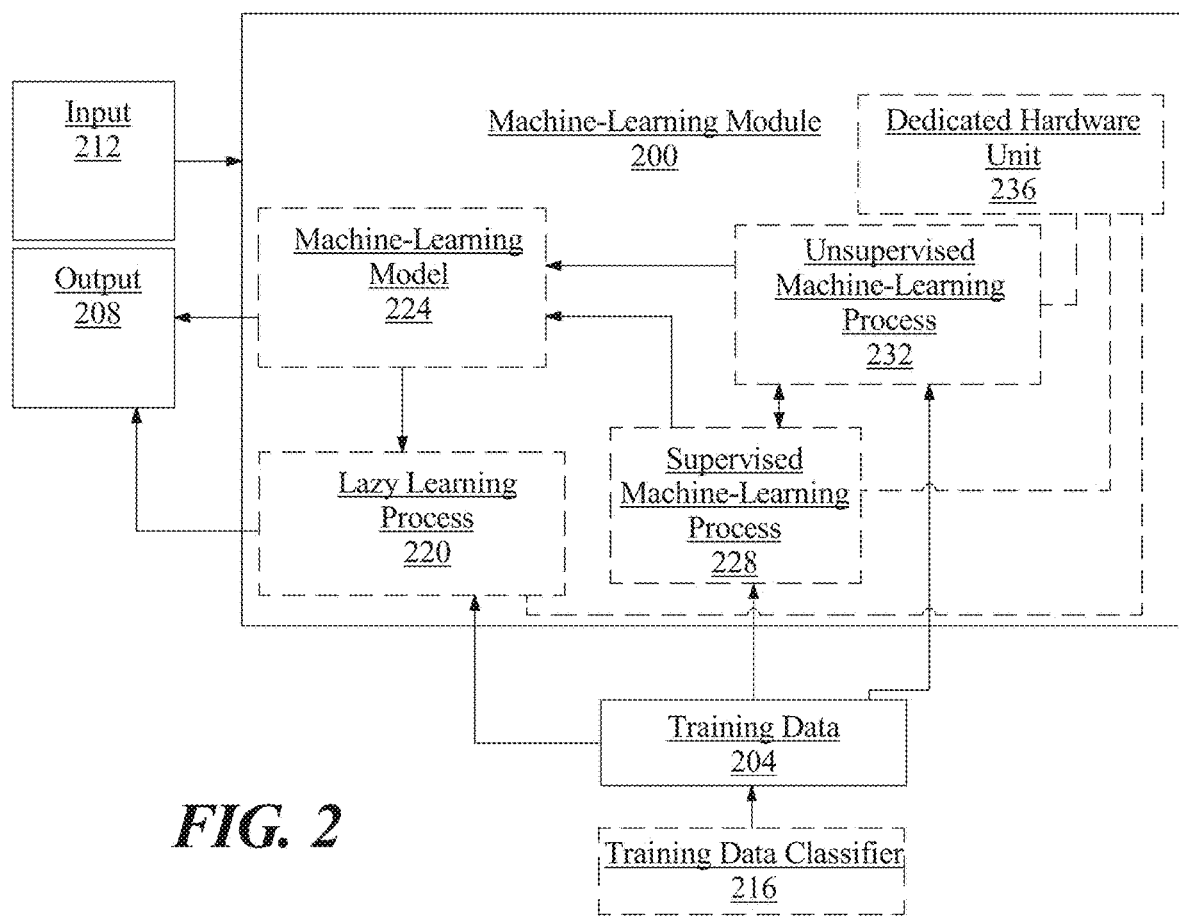
FIG. 2 is a block diagram of an exemplary machine-learning module.

Referring now to FIG. 2, an exemplary embodiment of a machine-learning module 200 that may perform one or more machine-learning processes as described in this disclosure is illustrated. Machine-learning module 200, as referenced by machine-learning processes 116 in FIG. 1, may perform determinations, classification, and/or analysis steps, methods, processes, or the like as described in this disclosure using machine-learning processes. A "machine-learning process," as used in this disclosure, is a process that automatedly uses training data 204 to generate an algorithm instantiated in hardware or software logic, data structures, and/or functions that will be performed by a computing device/module to produce outputs 208 given data provided as inputs 212; this is in contrast to a non-machine-learning software program where the commands to be executed are determined in advance by a user and written in a programming language.

Still referring to FIG. 2, "training data," as used herein, is data containing correlations that a machine-learning process may use to model relationships between two or more categories of data elements. For instance, and without limitation, training data 204 may include a plurality of data entries, also known as "training examples," each entry representing a set of data elements that were recorded, received, and/or generated together; data elements may be correlated by shared existence in a given data entry, by proximity in a given data entry, or the like. Multiple data entries in training data 204 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 204 according to various correlations; correlations may indicate causative and/or predictive links between categories of data elements, which may be modeled as relationships such as mathematical relationships by machine-learning processes as described in further detail below. Training data 204 may be formatted and/or organized by categories of data elements, for instance by associating data elements with one or more descriptors corresponding to categories of data elements. As a non-limiting example, training data 204 may include data entered in standardized forms by persons or processes, such that entry of a given data element in a given field in a form may be mapped to one or more descriptors of categories. Elements in training data 204 may be linked to descriptors of categories by tags, tokens, or other data elements; for instance, and without limitation, training data 204 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 2, training data 204 may include one or more elements that are not categorized; that is, training data 204 may not be formatted or contain descriptors for some elements of data. Machine-learning algorithms and/or other processes may sort training data 204 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 204 to be made applicable for two or more distinct machine-learning algorithms as described in further detail below. Training data 204 used by machine-learning module 200 may correlate any input data as described in this disclosure to any output data as described in this disclosure. As a non-limiting illustrative example a set of labeled seed data may be used as inputs to identify the affiliations relied upon for the seed data labels, then those affiliations may be used as training data to be applied to an unlabeled data set.

Further referring to FIG. 2, training data may be filtered, sorted, and/or selected using one or more supervised and/or unsupervised machine-learning processes and/or models as described in further detail below; such models may include without limitation a training data classifier 216. Training data classifier 216 may include a "classifier," which as used in this disclosure is a machine-learning model as defined below, such as a data structure representing and/or using a mathematical model, neural net, or program generated by a machine-learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. A distance metric may include any norm, such as, without limitation, a Pythagorean norm. Machine-learning module 200 may generate a classifier using a classification algorithm, defined as a process whereby a computing device and/or any module and/or component operating thereon derives a classifier from training data 204. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 216 may classify elements of training data to a certain type of patient or illness, wherein the sub-population of certain patients or illnesses is based on a set of symptoms or observed characteristics that distinguishes them from the entire patient population.

With further reference to FIG. 2, training examples for use as training data may be selected from a population of potential examples according to cohorts relevant to an analytical problem to be solved, a classification task, or the like. Alternatively or additionally, training data may be selected to span a set of likely circumstances or inputs for a machine-learning model and/or process to encounter when deployed. For instance, and without limitation, for each category of input data to a machine-learning process or model that may exist in a range of values in a population of phenomena such as images, user data, process data, physical data, or the like, a computing device, processor, and/or machine-learning model may select training examples representing each possible value on such a range and/or a representative sample of values on such a range. Selection of a representative sample may include selection of training examples in proportions matching a statistically determined and/or predicted distribution of such values according to relative frequency, such that, for instance, values encountered more frequently in a population of data so analyzed are represented by more training examples than values that are encountered less frequently. Alternatively or additionally, a set of training examples may be compared to a collection of representative values in a database and/or presented to a user, so that a process can detect, automatically or via user input, one or more values that are not included in the set of training examples. Computing device, processor, and/or module may automatically generate a missing training example; this may be done by receiving or retrieving a missing input and/or output value and correlating the missing input and/or output value with a corresponding output and/or input value collocated in a data record with the retrieved value, provided by a user and/or other device, or the like.

Still referring to FIG. 2, computer, processor, and/or module may be configured to sanitize training data. "Sanitizing" training data, as used in this disclosure, is a process whereby training examples are removed that interfere with convergence of a machine-learning model and/or process to a useful result. For instance, and without limitation, a training example may include an input and/or output value that is an outlier from typically encountered values, such that a machine-learning algorithm using the training example will be adapted to an unlikely amount as an input and/or output; a value that is more than a threshold number of standard deviations away from an average, mean, or expected value, for instance, may be eliminated. Alternatively or additionally, one or more training examples may be identified as having poor quality data, where "poor quality" is defined as having a signal to noise ratio below a threshold value.

As a non-limiting example, and with further reference to FIG. 2, images used to train an image classifier or other machine-learning model and/or process that takes images as inputs or generates images as outputs may be rejected if image quality is below a threshold value. For instance, and without limitation, computing device, processor, and/or module may perform blur detection, and eliminate one or more blur detection may be performed, as a non-limiting example, by taking Fourier transform, or an approximation such as a Fast Fourier Transform (FFT) of the image and analyzing a distribution of low and high frequencies in the resulting frequency-domain depiction of the image; numbers of high-frequency values below a threshold level may indicate blurriness. As a further non-limiting example, detection of blurriness may be performed by convolving an image, a channel of an image, or the like with a Laplacian kernel; this may generate a numerical score reflecting a number of rapid changes in intensity shown in the image, such that a high score indicates clarity and a low score indicates blurriness. Blurriness detection may be performed using a gradient-based operator, which measures operators based on the gradient or first derivative of an image, based on the hypothesis that rapid changes indicate sharp edges in the image, and thus are indicative of a lower degree of blurriness. Blur detection may be performed using Wavelet-based operator, which takes advantage of the capability of coefficients of the discrete wavelet transform to describe the frequency and spatial content of images. Blur detection may be performed using statistics-based operators take advantage of several image statistics as texture descriptors in order to compute a focus level. Blur detection may be performed by using discrete cosine transform (DCT) coefficients in order to compute a focus level of an image from its frequency content.

Continuing to refer to FIG. 2, computing device, processor, and/or module may be configured to precondition one or more training examples. For instance, and without limitation, where a machine-learning model and/or process has one or more inputs and/or outputs requiring, transmitting, or receiving a certain number of bits, samples, or other units of data, one or more training examples' elements to be used as or compared to inputs and/or outputs may be modified to have such a number of units of data. For instance, a computing device, processor, and/or module may convert a smaller number of units, such as in a low pixel count image, into a desired number of units, for instance by up-sampling and interpolating. As a non-limiting example, a low pixel count image may have 100 pixels, however a desired number of pixels may be 128. Processor may interpolate the low pixel count image to convert the 100 pixels into 128 pixels. It should also be noted that one of ordinary skill in the art, upon reading this disclosure, would know the various methods to interpolate a smaller number of data units such as samples, pixels, bits, or the like to a desired number of such units. In some instances, a set of interpolation rules may be trained by sets of highly detailed inputs and/or outputs and corresponding inputs and/or outputs down-sampled to smaller numbers of units, and a neural network or other machine-learning model that is trained to predict interpolated pixel values using the training data. As a non-limiting example, a sample input and/or output, such as a sample picture, with sample-expanded data units (e.g., pixels added between the original pixels) may be input to a neural network or machine-learning model and output a pseudo replica sample-picture with dummy values assigned to pixels between the original pixels based on a set of interpolation rules. As a non-limiting example, in the context of an image classifier, a machine-learning model may have a set of interpolation rules trained by sets of highly detailed images and images that have been down-sampled to smaller numbers of pixels, and a neural network or other machine-learning model that is trained using those examples to predict interpolated pixel values in a facial picture context. As a result, an input with sample-expanded data units (the ones added between the original data units, with dummy values) may be run through a trained neural network and/or model, which may fill in values to replace the dummy values. Alternatively or additionally, processor, computing device, and/or module may utilize sample expander methods, a low-pass filter, or both. As used in this disclosure, a "low-pass filter" is a filter that passes signals with a frequency lower than a selected cutoff frequency and attenuates signals with frequencies higher than the cutoff frequency. The exact frequency response of the filter depends on the filter design. Computing device, processor, and/or module may use averaging, such as luma or chroma averaging in images, to fill in data units in between original data units.

In some embodiments, and with continued reference to FIG. 2, computing device, processor, and/or module may down-sample elements of a training example to a desired lower number of data elements. As a non-limiting example, a high pixel count image may have 256 pixels, however a desired number of pixels may be 128. Processor may down-sample the high pixel count image to convert the 256 pixels into 128 pixels. In some embodiments, processor may be configured to perform down-sampling on data. Down-sampling, also known as decimation, may include removing every Nth entry in a sequence of samples, all but every Nth entry, or the like, which is a process known as "compression," and may be performed, for instance by an N-sample compressor implemented using hardware or software. Anti-aliasing and/or anti-imaging filters, and/or low-pass filters, may be used to clean up side-effects of compression.

Still referring to FIG. 2, machine-learning module 200 may be configured to perform a lazy-learning process 220 and/or protocol, which may alternatively be referred to as a "lazy loading" or "call-when-needed" process and/or protocol, may be a process whereby machine-learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 204. Heuristic may include selecting some number of highest-ranking associations and/or training data 204 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 2, machine-learning processes as described in this disclosure may be used to generate machine-learning models 224. A "machine-learning model," as used in this disclosure, is a data structure representing and/or instantiating a mathematical and/or algorithmic representation of a relationship between inputs and outputs, as generated using any machine-learning process including without limitation any process as described above, and stored in memory; an input is submitted to a machine-learning model 224 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 224 may be generated by creating an artificial neural network, such as a convolutional neural network comprising an input layer of nodes, one or more intermediate layers, and an output layer of nodes. Connections between nodes may be created via the process of "training" the network, in which elements from a training data 204 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 2, machine-learning algorithms may include at least a supervised machine-learning process 228. At least a supervised machine-learning process 228, as defined herein, include algorithms that receive a training set relating a number of inputs to a number of outputs, and seek to generate one or more data structures representing and/or instantiating one or more mathematical relations relating inputs to outputs, where each of the one or more mathematical relations is optimal according to some criterion specified to the algorithm using some scoring function. For instance, a supervised learning algorithm may include multiple variations of driveway-based sustainment profiles, as described above as inputs, classifier descriptors, as described above as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 204. Persons skilled in the art, upon reviewing the entirety of this disclosure, will be aware of various possible variations of at least a supervised machine-learning process 228 that may be used to determine relation between inputs and outputs. Supervised machine-learning processes may include classification algorithms as defined above.

With further reference to FIG. 2, training a supervised machine-learning process may include, without limitation, iteratively updating coefficients, biases, weights based on an error function, expected loss, and/or risk function. For instance, an output generated by a supervised machine-learning model using an input example in a training example may be compared to an output example from the training example; an error function may be generated based on the comparison, which may include any error function suitable for use with any machine-learning algorithm described in this disclosure, including a square of a difference between one or more sets of compared values or the like. Such an error function may be used in turn to update one or more weights, biases, coefficients, or other parameters of a machine-learning model through any suitable process including without limitation gradient descent processes, least-squares processes, and/or other processes described in this disclosure. This may be done iteratively and/or recursively to gradually tune such weights, biases, coefficients, or other parameters. Updating may be performed, in neural networks, using one or more back-propagation algorithms. Iterative and/or recursive updates to weights, biases, coefficients, or other parameters as described above may be performed until currently available training data is exhausted and/or until a convergence test is passed, where a "convergence test" is a test for a condition selected as indicating that a model and/or weights, biases, coefficients, or other parameters thereof has reached a degree of accuracy. A convergence test may, for instance, compare a difference between two or more successive errors or error function values, where differences below a threshold amount may be taken to indicate convergence. Alternatively or additionally, one or more errors and/or error function values evaluated in training iterations may be compared to a threshold.

Still referring to FIG. 2, a computing device, processor, and/or module may be configured to perform method, method step, sequence of method steps and/or algorithm described in reference to this figure, in any order and with any degree of repetition. For instance, a computing device, processor, and/or module may be configured to perform a single step, sequence and/or algorithm repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. A computing device, processor, and/or module may perform any step, sequence of steps, or algorithm in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Further referring to FIG. 2, machine-learning processes may include at least an unsupervised machine-learning processes 232. An unsupervised machine-learning process, as used herein, is a process that derives inferences in data sets without regard to labels; as a result, an unsupervised machine-learning process may be free to discover any structure, relationship, and/or correlation provided in the data. Unsupervised processes 232 may not require a response variable; unsupervised processes 232 may be used to find interesting patterns and/or inferences between variables, to determine a degree of correlation between two or more variables, or the like.

Still referring to FIG. 2, machine-learning module 200 may be designed and configured to create a machine-learning model 224 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 2, machine-learning algorithms may include, without limitation, linear discriminant analysis. Machine-learning algorithm may include quadratic discriminant analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized trees, AdaBoost, gradient tree boosting, and/or voting classifier methods. Machine-learning algorithms may include neural net algorithms, including convolutional neural net processes.

Still referring to FIG. 2, a machine-learning model and/or process may be deployed or instantiated by incorporation into a program, apparatus, system and/or module. For instance, and without limitation, a machine-learning model, neural network, and/or some or all parameters thereof may be stored and/or deployed in any memory or circuitry. Parameters such as coefficients, weights, and/or biases may be stored as circuit-based constants, such as arrays of wires and/or binary inputs and/or outputs set at logic "1" and "0" voltage levels in a logic circuit to represent a number according to any suitable encoding system including twos complement or the like or may be stored in any volatile and/or non-volatile memory. Similarly, mathematical operations and input and/or output of data to or from models, neural network layers, or the like may be instantiated in hardware circuitry and/or in the form of instructions in firmware, machine-code such as binary operation code instructions, assembly language, or any higher-order programming language. Any technology for hardware and/or software instantiation of memory, instructions, data structures, and/or algorithms may be used to instantiate a machine-learning process and/or model, including without limitation any combination of production and/or configuration of non-reconfigurable hardware elements, circuits, and/or modules such as without limitation ASICs, production and/or configuration of reconfigurable hardware elements, circuits, and/or modules such as without limitation FPGAs, production and/or of non-reconfigurable and/or configuration non-rewritable memory elements, circuits, and/or modules such as without limitation non-rewritable ROM, production and/or configuration of reconfigurable and/or rewritable memory elements, circuits, and/or modules such as without limitation rewritable ROM or other memory technology described in this disclosure, and/or production and/or configuration of any computing device and/or component thereof as described in this disclosure. Such deployed and/or instantiated machine-learning model and/or algorithm may receive inputs from any other process, module, and/or component described in this disclosure, and produce outputs to any other process, module, and/or component described in this disclosure.

Continuing to refer to FIG. 2, any process of training, retraining, deployment, and/or instantiation of any machine-learning model and/or algorithm may be performed and/or repeated after an initial deployment and/or instantiation to correct, refine, and/or improve the machine-learning model and/or algorithm. Such retraining, deployment, and/or instantiation may be performed as a periodic or regular process, such as retraining, deployment, and/or instantiation at regular elapsed time periods, after some measure of volume such as a number of bytes or other measures of data processed, a number of uses or performances of processes described in this disclosure, or the like, and/or according to a software, firmware, or other update schedule. Alternatively or additionally, retraining, deployment, and/or instantiation may be event-based, and may be triggered, without limitation, by user inputs indicating sub-optimal or otherwise problematic performance and/or by automated field testing and/or auditing processes, which may compare outputs of machine-learning models and/or algorithms, and/or errors and/or error functions thereof, to any thresholds, convergence tests, or the like, and/or may compare outputs of processes described herein to similar thresholds, convergence tests or the like. Event-based retraining, deployment, and/or instantiation may alternatively or additionally be triggered by receipt and/or generation of one or more new training examples; a number of new training examples may be compared to a preconfigured threshold, where exceeding the preconfigured threshold may trigger retraining, deployment, and/or instantiation.

Still referring to FIG. 2, retraining and/or additional training may be performed using any process for training described above, using any currently or previously deployed version of a machine-learning model and/or algorithm as a starting point. Training data for retraining may be collected, preconditioned, sorted, classified, sanitized or otherwise processed according to any process described in this disclosure. Training data may include, without limitation, training examples including inputs and correlated outputs used, received, and/or generated from any version of any system, module, machine-learning model or algorithm, apparatus, and/or method described in this disclosure; such examples may be modified and/or labeled according to user feedback or other processes to indicate desired results, and/or may have actual or measured results from a process being modeled and/or predicted by system, module, machine-learning model or algorithm, apparatus, and/or method as "desired" results to be compared to outputs for training processes as described above. Redeployment may be performed using any reconfiguring and/or rewriting of reconfigurable and/or rewritable circuit and/or memory elements; alternatively, redeployment may be performed by production of new hardware and/or software components, circuits, instructions, or the like, which may be added to and/or may replace existing hardware and/or software components, circuits, instructions, or the like.

Further referring to FIG. 2, one or more processes or algorithms described above may be performed by at least a dedicated hardware unit 236. A "dedicated hardware unit," for the purposes of this figure, is a hardware component, circuit, or the like, aside from a principal control circuit and/or processor performing method steps as described in this disclosure, that is specifically designated or selected to perform one or more specific tasks and/or processes described in reference to this figure, such as without limitation preconditioning and/or sanitization of training data and/or training a machine-learning algorithm and/or model. A dedicated hardware unit 236 may include, without limitation, a hardware unit that can perform iterative or massed calculations, such as matrix-based calculations to update or tune parameters, weights, coefficients, and/or biases of machine-learning models and/or neural networks, efficiently using pipelining, parallel processing, or the like; such a hardware unit may be optimized for such processes by, for instance, including dedicated circuitry for matrix and/or signal processing operations that includes, e.g., multiple arithmetic and/or logical circuit units such as multipliers and/or adders that can act simultaneously and/or in parallel or the like. Such dedicated hardware units 236 may include, without limitation, graphical processing units (GPUs), dedicated signal processing modules, FPGA or other reconfigurable hardware that has been configured to instantiate parallel processing units for one or more specific tasks, or the like, A computing device, processor, apparatus, or module may be configured to instruct one or more dedicated hardware units 236 to perform one or more operations described herein, such as evaluation of model and/or algorithm outputs, one-time or iterative updates to parameters, coefficients, weights, and/or biases, and/or any other operations such as vector and/or matrix operations as described in this disclosure.

Figure 3:
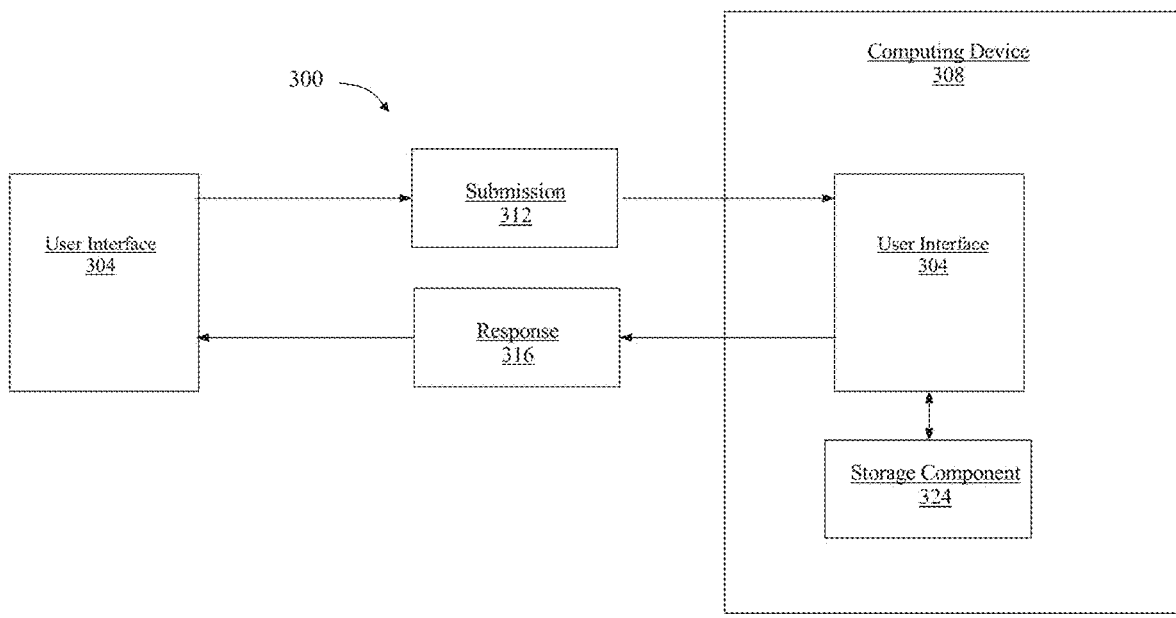
FIG. 3 is an exemplary embodiment of a chatbot implementation.

Referring to FIG. 3, a chatbot system 300 is schematically illustrated. According to some embodiments, a user interface 304 may be communicative with a computing device 308 that is configured to operate a chatbot. In some cases, user interface 304 may be local to computing device 308. Alternatively or additionally, in some cases, user interface 304 may remote to computing device 308 and communicative with the computing device 308, by way of one or more networks, such as without limitation the internet. Alternatively or additionally, user interface 304 may communicate with user device 308 using telephonic devices and networks, such as without limitation fax machines, short message service (SMS), or multimedia message service (MMS). Commonly, user interface 304 communicates with computing device 308 using text-based communication, for example without limitation using a character encoding protocol, such as American Standard for Information Interchange (ASCII). Typically, a user interface 304 conversationally interfaces a chatbot, by way of at least a submission 312, from the user interface 308 to the chatbot, and a response 316, from the chatbot to the user interface 304. In many cases, one or both of submission 312 and response 316 are text-based communication. Alternatively or additionally, in some cases, one or both of submission 312 and response 316 are audio-based communication.

Continuing in reference to FIG. 3, a submission 312 once received by computing device 308 operating a chatbot, may be processed by a processor. In some embodiments, processor processes a submission 312 using one or more of keyword recognition, pattern matching, and natural language processing. In some embodiments, processor employs real-time learning with evolutionary algorithms. In some cases, processor may retrieve a pre-prepared response from at least a storage component 320, based upon submission 312. Alternatively or additionally, in some embodiments, processor communicates a response 316 without first receiving a submission 312, thereby initiating conversation. In some cases, processor communicates an inquiry to user interface 304; and the processor is configured to process an answer to the inquiry in a following submission 312 from the user interface 304. In some cases, an answer to an inquiry presented within a submission 312 from a user device 304 may be used by computing device 308 as an input to another function.

With continued reference to FIG. 3, chatbot may be configured to provide a user with a plurality of options as an input into the chatbot. Chatbot entries may include multiple choice, short answer response, true or false responses, and the like. A user may decide on what type of chatbot entries are appropriate. In some embodiments, the chatbot may be configured to allow the user to input a freeform response into the chatbot. Chatbot may then use a decision tree, data base, or other data structure to respond to the user's entry into the chatbot as a function of a chatbot input. As used in the current disclosure, "Chatbot input" is any response that an entity or user inputs into a chatbot as a response to a prompt or question.

With continuing reference to FIG. 3, computing device 308 may be configured to respond to a chatbot input using a decision tree. A "decision tree," as used in this disclosure, is a data structure that represents and combines one or more determinations or other computations based on and/or concerning data provided thereto, as well as earlier such determinations or calculations, as nodes of a tree data structure where inputs of some nodes are connected to outputs of others. Decision tree may have at least a root node, or node that receives data input to the decision tree, corresponding to at least a candidate input into a chatbot. Decision tree has at least a terminal node, which may alternatively or additionally be referred to herein as a "leaf node," corresponding to at least an exit indication; in other words, decision and/or determinations produced by decision tree may be output at the at least a terminal node. Decision tree may include one or more internal nodes, defined as nodes connecting outputs of root nodes to inputs of terminal nodes. Computing device 308 may generate two or more decision trees, which may overlap; for instance, a root node of one tree may connect to and/or receive output from one or more terminal nodes of another tree, intermediate nodes of one tree may be shared with another tree, or the like.

Still referring to FIG. 3, computing device 308 may build decision tree by following relational identification; for example, relational indication may specify that a first rule module receives an input from at least a second rule module and generates an output to at least a third rule module, and so forth, which may indicate to computing device 308 an in which such rule modules will be placed in decision tree. Building decision tree may include recursively performing mapping of execution results output by one tree and/or subtree to root nodes of another tree and/or subtree, for instance by using such execution results as execution parameters of a subtree. In this manner, computing device 308 may generate connections and/or combinations of one or more trees to one another to define overlaps and/or combinations into larger trees and/or combinations thereof. Such connections and/or combinations may be displayed by visual interface to user, for instance in first view, to enable viewing, editing, selection, and/or deletion by user; connections and/or combinations generated thereby may be highlighted, for instance using a different color, a label, and/or other form of emphasis aiding in identification by a user. In some embodiments, subtrees, previously constructed trees, and/or entire data structures may be represented and/or converted to rule modules, with graphical models representing them, and which may then be used in further iterations or steps of generation of decision tree and/or data structure. Alternatively or additionally, subtrees, previously constructed trees, and/or entire data structures may be converted to APIs to interface with further iterations or steps of methods as described in this disclosure. As a further example, such subtrees, previously constructed trees, and/or entire data structures may become remote resources to which further iterations or steps of data structures and/or decision trees may transmit data and from which further iterations or steps of generation of data structure receive data, for instance as part of a decision in a given decision tree node.

Continuing to refer to FIG. 3, decision tree may incorporate one or more manually entered or otherwise provided decision criteria. Decision tree may incorporate one or more decision criteria using an API. Decision tree may establish a link to a remote decision module, device, system, or the like. Decision tree may perform one or more database lookups and/or look-up table lookups. Decision tree may include at least a decision calculation module, which may be imported via an API, by incorporation of a program module in source code, executable, or other form, and/or linked to a given node by establishing a communication interface with one or more exterior processes, programs, systems, remote devices, or the like; for instance, where a user operating system has a previously existent calculation and/or decision engine configured to make a decision corresponding to a given node, for instance and without limitation using one or more elements of domain knowledge, by receiving an input and producing an output representing a decision, a node may be configured to provide data to the input and receive the output representing the decision, based upon which the node may perform its decision. In a non-limiting embodiment, based on a limited set of consultation information provided for input, decision tree may generate a plurality of follow-up questions, each based on the aggregated sum of data available from all inputs. Specifically, a consultation dataset containing only picture of a dilapidated roof may generate a branch of questions focused on a variety of potential roof repairs, wherein a positive assertion to a question about animal-induced roof leaks may further trigger questions to initially eliminate other weather-based or insulation lining-based potential causes, then eventually narrow in to explicitly isolate the condition to a defined candidate set. Continuing with the roof leak example, a follow up question may query about recent visual inspections, including any rodent feces, wherein an affirmative response may trigger a query of the common species within the regional ecosystem which may be capable of having caused the damage. These decision tree questions may be used to bridge the gap of subject data symptoms to available candidate sets. So immediately once chatbot 300 is able to isolate subject data to an available candidate set, questioning would conclude. User feedback to affirm or reject the identified candidate set would be used as training data for future chatbot interrogations and candidate set affiliations as described above.

Figure 4:
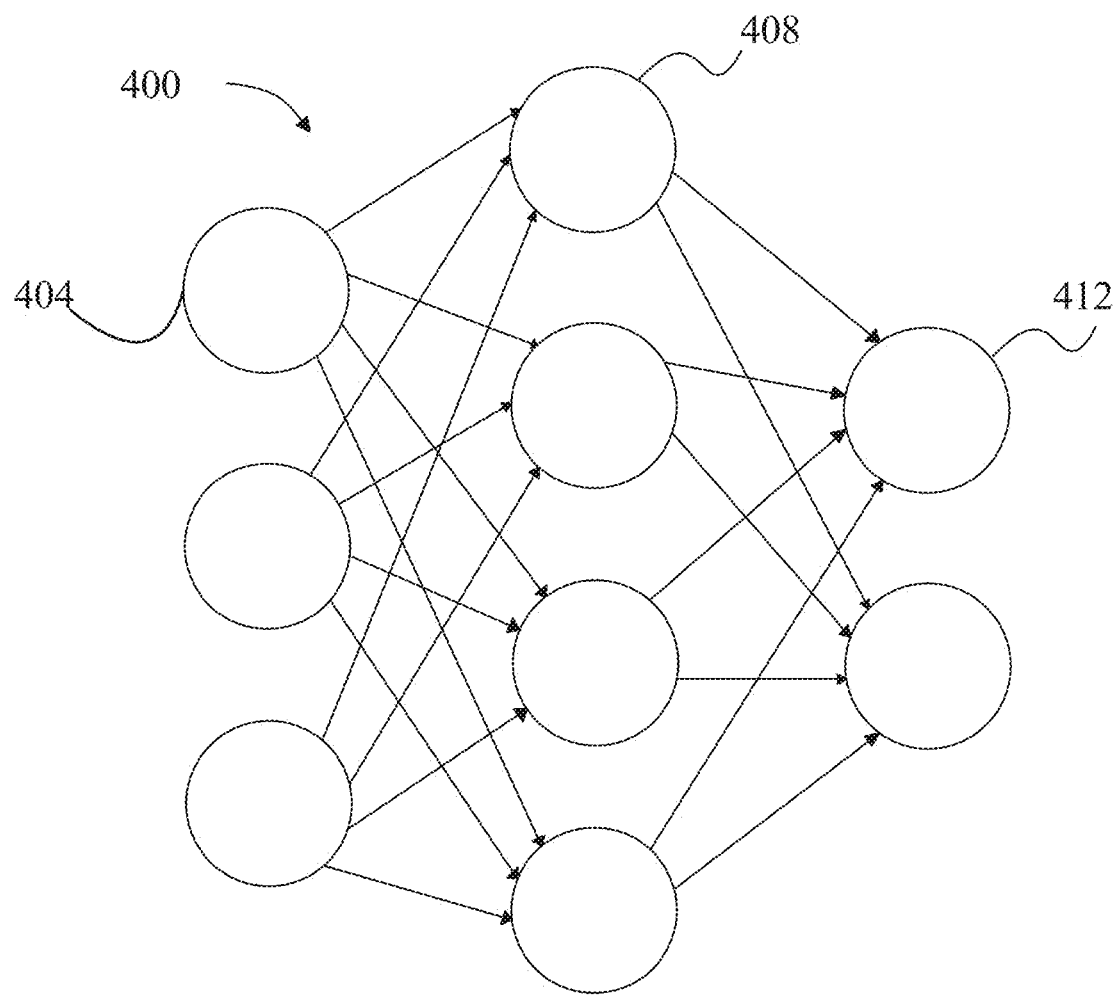
FIG. 4 is a diagram of an exemplary embodiment of a neural network.

Referring now to FIG. 4, an exemplary embodiment of neural network 400 is illustrated. A neural network 400 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 404, one or more intermediate layers 408, and an output layer of nodes 412. In a non-limiting embodiment, input layer of nodes 404 may include any remote display where user inputs may be provided from, while output layer of nodes 412 may include either the local device if it has the processing capability to support the requisite machine-learning processes, or output layer of nodes 412 may refer to a centralized, network connected processor able to remotely conduct the machine-learning processes described herein. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. Connections may run solely from input nodes toward output nodes in a "feed-forward" network, or may feed outputs of one layer back to inputs of the same or a different layer in a "recurrent network." As a further non-limiting example, a neural network may include a convolutional neural network comprising an input layer of nodes, one or more intermediate layers, and an output layer of nodes. A "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like.

Figure 5:
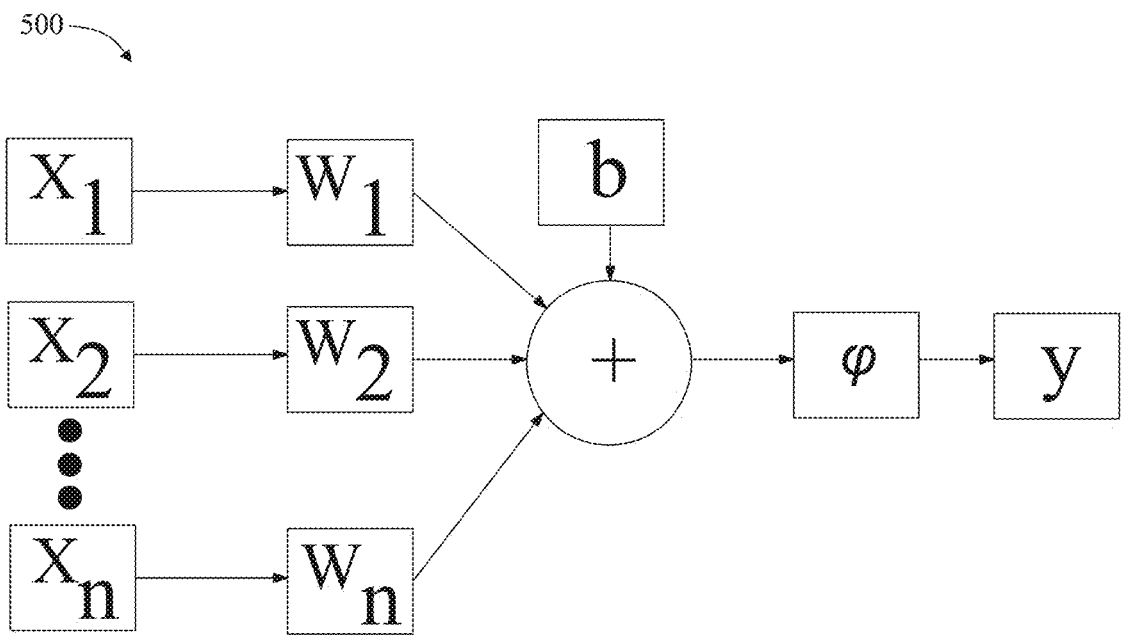
FIG. 5 is a diagram of an exemplary embodiment of a node of a neural network.

Referring now to FIG. 5, an exemplary embodiment of a node 500 of a neural network is illustrated. A node may include, without limitation, a plurality of inputs $x_i$ that may receive numerical values from inputs to a neural network containing the node and/or from other nodes. Node may perform one or more activation functions to produce its output given one or more inputs, such as without limitation computing a binary step function comparing an input to a threshold value and outputting either a logic 1 or logic 0 output or something equivalent, a linear activation function whereby an output is directly proportional to the input, and/or a non-linear activation function, wherein the output is not proportional to the input. Non-linear activation functions may include, without limitation, a sigmoid function of the form $$f(x) = \frac{1}{1 - e^{-x}}$$

given input x, a tanh (hyperbolic tangent) function, of the form $$\frac{e^x - e^{-x}}{e^x + e^{-x}},$$

a tanh derivative function such as $f(x)=\tanh^2(x)$, a rectified linear unit function such as $f(x)=\max(0,x)$, a "leaky" and/or "parametric" rectified linear unit function such as $f(x)=\max(ax, x)$ for some a, an exponential linear units function such as $$f(x) = \begin{cases} x \text{ for } x \geq 0 \\ \alpha(e^x - 1) \text{ for } x < 0 \end{cases}$$

for some value of α (this function may be replaced and/or weighted by its own derivative in some embodiments), a softmax function such as $$f(x_i) = \frac{e^x}{\sum_i x_i}$$

where the inputs to an instant layer are $x_i$, a swish function such as $f(x)=x*\text{sigmoid}(x)$, a Gaussian error linear unit function such as $f(x)=a(1+\tanh(\sqrt{2/\pi}(x+bx^r)))$ for some values of a, b, and r, and/or a scaled exponential linear unit function such as $$f(x) = \lambda \begin{cases} \alpha(e^x - 1) \text{ for } x < 0 \\ x \text{ for } x \geq 0 \end{cases}.$$

Fundamentally, there is no limit to the nature of functions of inputs $x_i$ that may be used as activation functions. As a non-limiting and illustrative example, node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function φ, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above.

Figure 6:
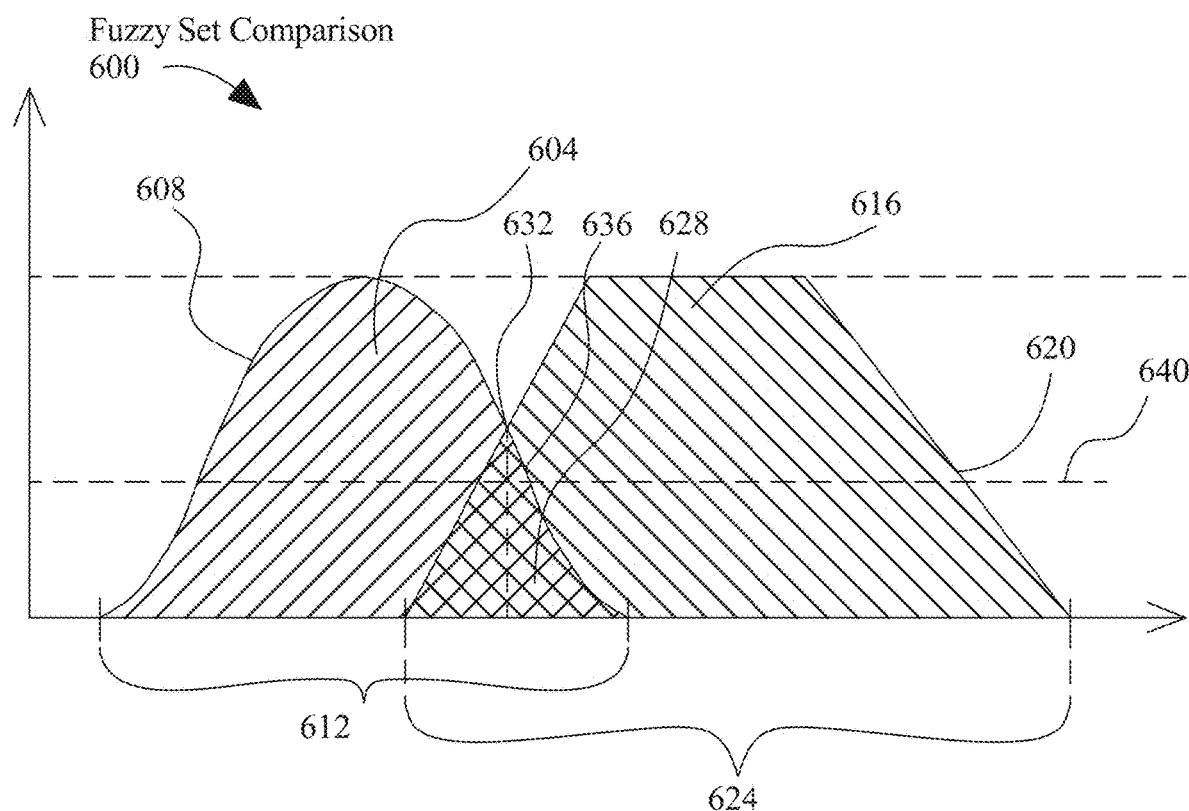
FIG. 6 is an exemplary embodiment of a fuzzy set comparison.

Referring now to FIG. 6, an exemplary embodiment of fuzzy set comparison 600 is illustrated. In a non-limiting embodiment, fuzzy sets may be used to analyze and correlate classifier descriptors based on the sustainment profile with the verified appropriate appended classifier descriptors within a candidate set. A first fuzzy set 604 may be represented, without limitation, according to a first membership function 608 representing a probability that an input falling on a first range of values 612 is a member of the first fuzzy set 604, where first membership function 608 has values on a range of probabilities such as without limitation the interval [0,1], and an area beneath first membership function 608 may represent a set of values within first fuzzy set 604. Although first range of values 612 is illustrated for clarity in this exemplary depiction as a range on a single number line or axis, first range of values 612 may be defined on two or more dimensions, representing, for instance, a Cartesian product between a plurality of ranges, curves, axes, spaces, dimensions, or the like. First membership function 608 may include any suitable function mapping first range 612 to a probability interval, including without limitation a triangular function defined by two linear elements such as line segments or planes that intersect at or below the top of the probability interval. As a non-limiting example, triangular membership function may be defined as:

$$y(x, a, b, c) = \begin{cases} 0, \text{ for } x > c \text{ and } x < a \\ \frac{x - a}{b - a}, \text{ for } a \leq x < b \\ \frac{c - x}{c - b}, \text{ if } b < x \leq c \end{cases}$$

a trapezoidal membership function may be defined as:

$$y(x, a, b, c, d) = \max\left(\min\left(\frac{x-a}{b-a}, 1, \frac{d-x}{d-c}\right), 0\right)$$

a sigmoidal function may be defined as:

$$y(x, a, c) = \frac{1}{1 - e^{-a(x-c)}}$$

a Gaussian membership function may be defined as:

$$y(x, c, \sigma) = e^{-\frac{1}{2}(\frac{x-c}{\sigma})^2}$$

and a bell membership function may be defined as:

$$y(x, a, b, c,) = \left[1 + \left|\frac{x-c}{a}\right|^{2b}\right]^{-1}$$

Persons skilled in the art, upon reviewing the entirety of this disclosure, will be aware of various alternative or additional membership functions that may be used consistently with this disclosure.

Still referring to FIG. 6, first fuzzy set 604 may represent any value or combination of values as described above, including output from one or more machine-learning models, a predetermined class, such as without limitation, a set of driveway images which may be indicative of a concrete driveway suffering from moderate to severe cracking caused by a protruding root structure. A second fuzzy set 616, which may represent any value which may be represented by first fuzzy set 604, may be defined by a second membership function 620 on a second range 624; second range 624 may be identical and/or overlap with first range 612 and/or may be combined with first range 612 via Cartesian product or the like to generate a mapping permitting evaluation overlap of first fuzzy set 604 and second fuzzy set 616. Continuing the non-limiting embodiment where first fuzzy set 604 may be a set of driveway images which may contain certain symptoms, second fuzzy set 616 may be a set of specific conditions known to be indicative of a tree root-induced crack in a concrete driveway. Where first fuzzy set 604 and second fuzzy set 616 have a region 628 that overlaps, first membership function 608 and second membership function 620 may intersect at a point 632 representing a probability, as defined on probability interval, of a match between first fuzzy set 604 and second fuzzy set 616. Alternatively or additionally, a single value of first and/or second fuzzy set may be located at a locus 636 on first range 612 and/or second range 624, where a probability of membership may be taken by evaluation of first membership function 608 and/or second membership function 620 at that range point. A probability at 628 and/or 632 may be compared to a threshold 640 to determine whether a positive match is indicated. Threshold 640 may, in a non-limiting example, represent a degree of match between first fuzzy set 604 and second fuzzy set 616, and/or single values therein with each other or with either set, which is sufficient for purposes of the matching process; for instance, threshold may indicate a sufficient degree of overlap between a set of wood panel roofing corrosion and the specified set of mold-induced corrosion for combination to occur as described above, thereby indicating a strong likelihood of the roof having a mold-induced corrosion issue. Alternatively or additionally, each threshold may be tuned by a machine-learning process.

Figure 7:
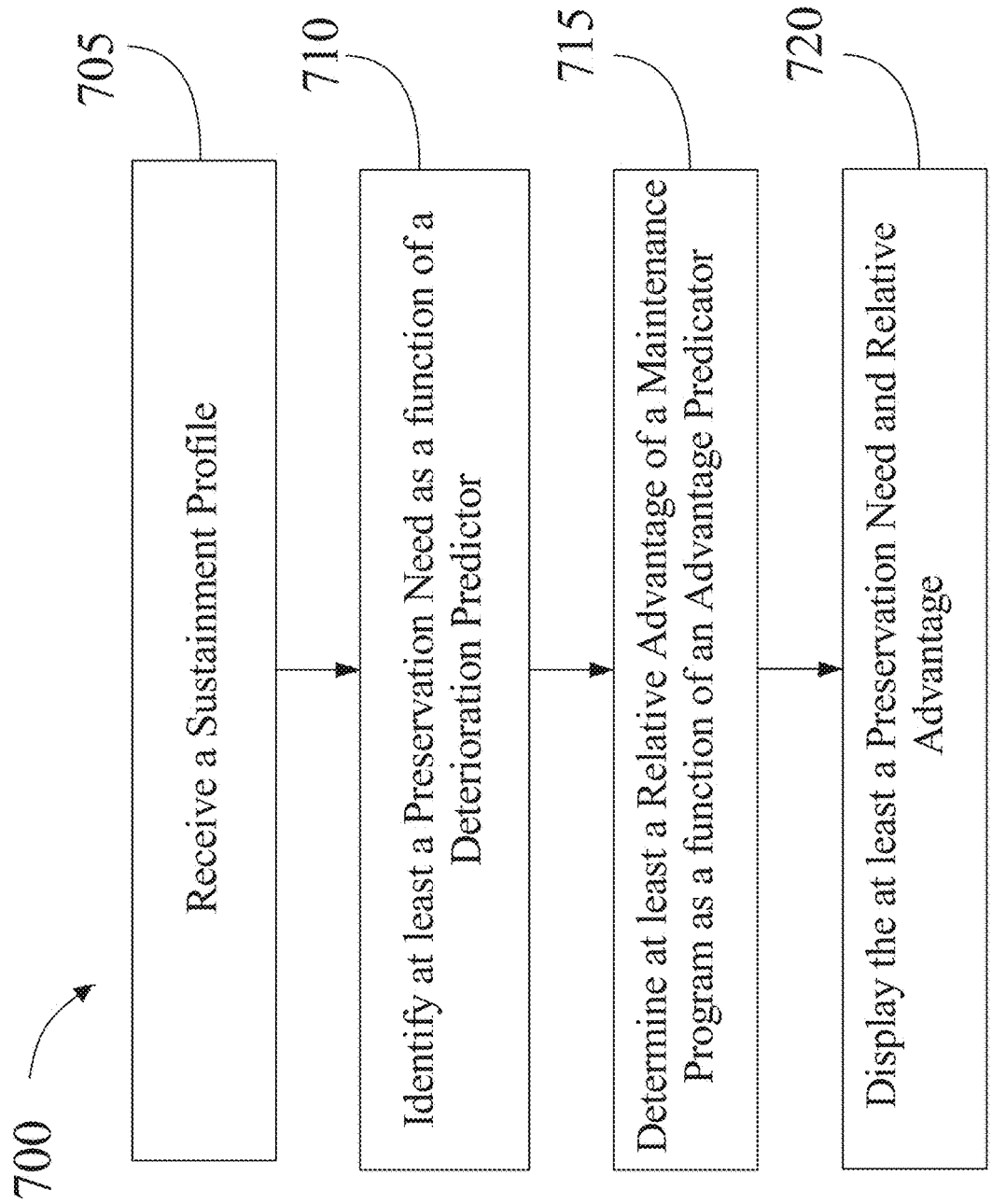
FIG. 7 is a flow diagram illustrating a method for analysis of preservation requirements using a dual-predictor architecture.

Referring now to FIG. 7, a method 700 for analysis of preservation requirements using a dual-predictor architecture is illustrated. Method 700 includes a step 705 of receiving, using at least a processor, a sustainment profile. In some embodiments, receiving the sustainment profile may include communicating with a user using a chatbot to collect required data. In some embodiments, receiving the sustainment profile may include populating the required data within the sustainment profile. In some embodiments, receiving the sustainment profile may include receiving a plurality of images containing at least a maintenance engagement datum. In some embodiments, receiving the sustainment profile may include determining a plurality of preservation classifications as a function of the plurality of images using an image classifier. This may be implemented as described with reference to FIGS. 1-6.

With continued reference to FIG. 7, method 700 includes a step 710 of identifying, by the at least a processor, at least a preservation need as a function of a deterioration predictor, wherein the deterioration predictor is configured to output a plurality of rates corresponding to a plurality of physical process variables. This may be implemented as described with reference to FIGS. 1-6.

With continued reference to FIG. 7, method 700 includes a step 715 of determining, by the at least a processor, at least a relative advantage of a maintenance program as a function of an advantage predictor, wherein the advantage predictor is configured to receive the preservation need as input and output the relative advantage. In some embodiments, the advantage predictor may include a plurality of Markov chains, wherein each Markov chain includes a plurality of states and transitions between the plurality of states. This may be implemented as described with reference to FIGS. 1-6.

With continued reference to FIG. 7, method 700 includes a step 720 of displaying, by the at least a processor, through a graphical user interface, the at least a preservation need and relative advantage. This may be implemented as described with reference to FIGS. 1-6.

With continued reference to FIG. 7, method 700 may include a step of determining, by the at least a processor, a prioritized maintenance program. In some embodiments, determining the prioritized maintenance program may include retrieving the prioritized maintenance program as a function of the preservation need. In some embodiments, determining the prioritized maintenance program may include retrieving an initial maintenance program as a function of the preservation need. In some embodiments, determining the prioritized maintenance program may include adjusting the initial maintenance program as a function of a geographic datum and material type. This may be implemented as described with reference to FIGS. 1-6.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 8:
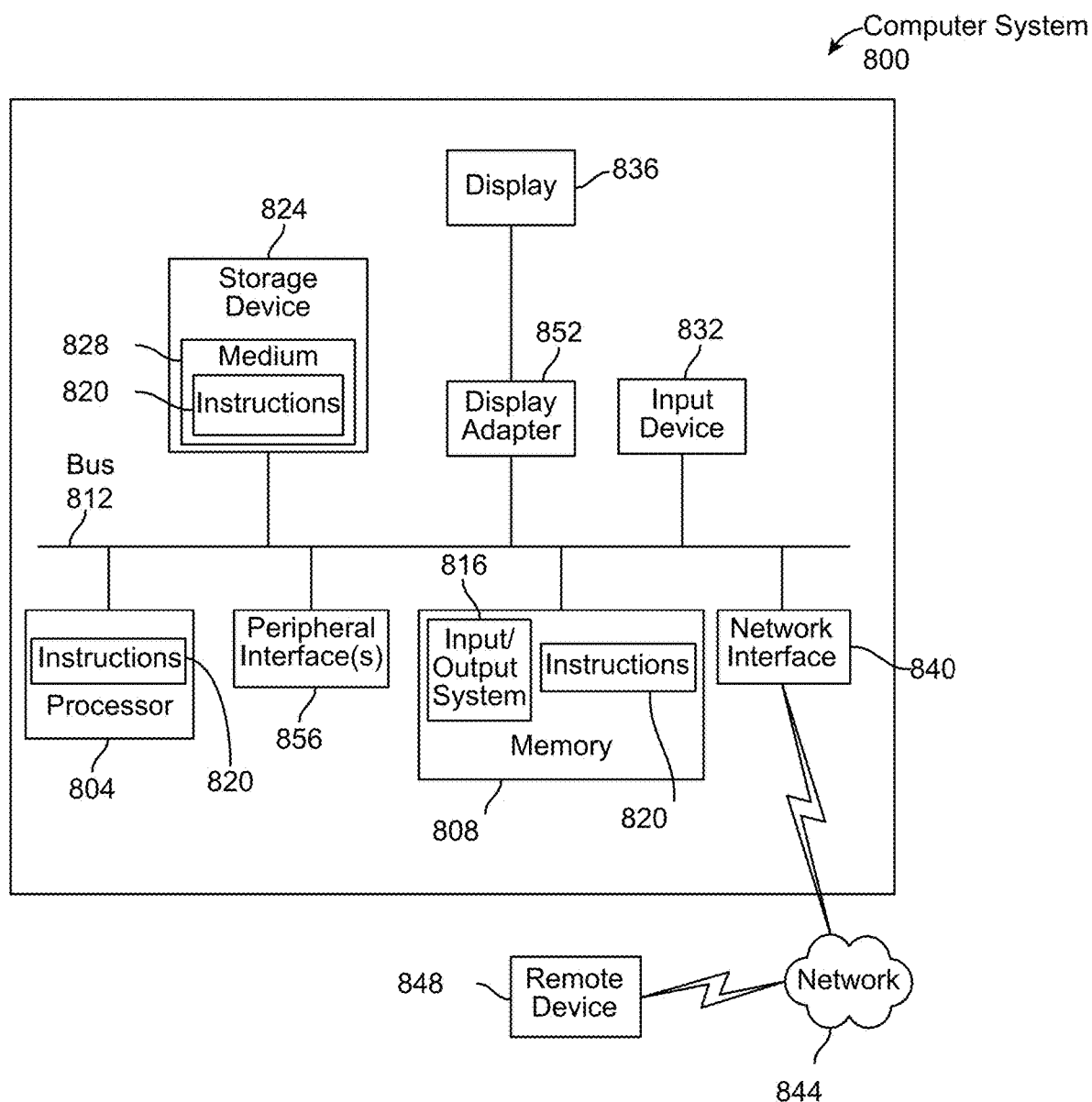
FIG. 8 is a block diagram of a computing system that can be used to implement any one or more of the methodologies disclosed herein and any one or more portions thereof.

FIG. 8 shows a diagrammatic representation of one embodiment of a computing device in the exemplary form of a computer system 800 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 800 includes a processor 804 and a memory 808 that communicate with each other, and with other components, via a bus 812. Bus 812 may include any of several types of bus structures including, but not limited to, a memory bus, a memory controller, a peripheral bus, a local bus, and any combinations thereof, using any of a variety of bus architectures.

Processor 804 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 804 may be organized according to Von Neumann and/or Harvard architecture as a non-limiting example. Processor 804 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), system on module (SOM), and/or system on a chip (SoC).

Memory 808 may include various components (e.g., machine-readable media) including, but not limited to, a random-access memory component, a read only component, and any combinations thereof. In one example, a basic input/output system 816 (BIOS), including basic routines that help to transfer information between elements within computer system 800, such as during start-up, may be stored in memory 808. Memory 808 may also include (e.g., stored on one or more machine-readable media) instructions (e.g., software) 820 embodying any one or more of the aspects and/or methodologies of the present disclosure. In another example, memory 808 may further include any number of program modules including, but not limited to, an operating system, one or more application programs, other program modules, program data, and any combinations thereof.

Computer system 800 may also include a storage device 824. Examples of a storage device (e.g., storage device 824) include, but are not limited to, a hard disk drive, a magnetic disk drive, an optical disc drive in combination with an optical medium, a solid-state memory device, and any combinations thereof. Storage device 824 may be connected to bus 812 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 824 (or one or more components thereof) may be removably interfaced with computer system 800 (e.g., via an external port connector (not shown)). Particularly, storage device 824 and an associated machine-readable medium 828 may provide nonvolatile and/or volatile storage of machine-readable instructions, data structures, program modules, and/or other data for computer system 800. In one example, software 820 may reside, completely or partially, within machine-readable medium 828. In another example, software 820 may reside, completely or partially, within processor 804.

Computer system 800 may also include an input device 832. In one example, a user of computer system 800 may enter commands and/or other information into computer system 800 via input device 832. Examples of an input device 832 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 832 may be interfaced to bus 812 via any of a variety of interfaces (not shown) including, but not limited to, a serial interface, a parallel interface, a game port, a USB interface, a FIREWIRE interface, a direct interface to bus 812, and any combinations thereof. Input device 832 may include a touch screen interface that may be a part of or separate from display 836, discussed further below. Input device 832 may be utilized as a user selection device for selecting one or more graphical representations in a graphical interface as described above.

A user may also input commands and/or other information to computer system 800 via storage device 824 (e.g., a removable disk drive, a flash drive, etc.) and/or network interface device 840. A network interface device, such as network interface device 840, may be utilized for connecting computer system 800 to one or more of a variety of networks, such as network 844, and one or more remote devices 848 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 844, may employ a wired and/or a wireless mode of communication. In general, any network topology may be used. Information (e.g., data, software 820, etc.) may be communicated to and/or from computer system 800 via network interface device 840.

Computer system 800 may further include a video display adapter 852 for communicating a displayable image to a display device, such as display device 836. Examples of a display device include, but are not limited to, a liquid crystal display (LCD), a cathode ray tube (CRT), a plasma display, a light emitting diode (LED) display, and any combinations thereof. Display adapter 852 and display device 836 may be utilized in combination with processor 804 to provide graphical representations of aspects of the present disclosure. In addition to a display device, computer system 800 may include one or more other peripheral output devices including, but not limited to, an audio speaker, a printer, and any combinations thereof. Such peripheral output devices may be connected to bus 812 via a peripheral interface 856. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve the methods according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An apparatus for analysis of preservation requirements using a dual-predictor architecture, wherein the apparatus comprises:

at least a processor, and a memory communicatively connected to the at least a processor, the memory containing instructions configuring the at least a processor to:
receive a sustainment profile, wherein the sustainment profile comprises one or more images;
identify at least a preservation need as a function of a deterioration predictor, wherein the deterioration predictor comprises a machine-learning model configured to receive the sustainment profile as an input and output a plurality of rates corresponding to a plurality of physical process variables, wherein the machine-learning model is trained using deterioration training data including a plurality of sustainment profiles inputs correlated to a plurality of rates outputs;
receive user feedback relating to the plurality of rates outputs from the machine-learning model;
determine an accuracy score for the machine-learning model based on the user feedback, wherein the accuracy score indicates to a number of retraining cycles required for the machine-learning model;
modify the deterioration training data based on the user feedback and the accuracy score to generate modified deterioration training data;
perform event-based retraining of the machine-learning model using the modified deterioration training data based on the accuracy score, wherein retraining comprises performing a convergence test requiring a predetermined mean squared error;
determine at least a relative advantage of a maintenance program as a function of an advantage predictor, wherein the advantage predictor is configured to receive the preservation need as input and output the maintenance program and the relative advantage;
display, through a graphical user interface, the at least a preservation need and relative advantage.

2. The apparatus of claim 1, wherein receiving the sustainment profile comprises:
communicating with a user using a chatbot to collect required data; and
populating the required data within the sustainment profile.

3. The apparatus of claim 1, wherein the sustainment profile comprises at least an image and at least a geographic datum.

4. The apparatus of claim 1, wherein receiving the sustainment profile comprises:
receiving at least a maintenance engagement datum; and
determining a plurality of preservation classifications as a function of the plurality of images using an image classifier.

5. The apparatus of claim 4, wherein the plurality of preservation classifications comprises a material type.

6. The apparatus of claim 1, wherein the advantage predictor comprises a plurality of Markov chains, wherein each Markov chain comprises a plurality of states and transitions between the plurality of states.

7. The apparatus of claim 1, wherein the memory contains instructions further configuring the at least a processor to determine the maintenance program, wherein determining the maintenance program comprises retrieving the maintenance program as a function of the preservation need.

8. The apparatus of claim 1, wherein the memory contains instructions further configuring the at least a processor to determine the maintenance program, wherein determining the maintenance program comprises:

retrieving an initial maintenance program as a function of the preservation need; and adjusting the initial maintenance program as a function of a geographic datum and material type.

9. The apparatus of claim 1, wherein:

the sustainment profile comprises a geographic datum; and the deterioration predictor is configured to receive the sustainment profile comprising the geographic datum as input and output the plurality of rates.

10. The apparatus of claim 1, wherein:

the sustainment profile comprises a material type; and the deterioration predictor is configured to receive the sustainment profile comprising the material type as input and output the plurality of rates.

11. A method for analysis of preservation requirements using a dual-predictor architecture, wherein the method comprises:

receiving, using at least a processor, a sustainment profile, wherein the sustainment profile comprises one or more images;

identifying, by the at least a processor, at least a preservation need as a function of a deterioration predictor, wherein the deterioration predictor comprises a machine-learning model configured to receive the sustainment profile as an input and output a plurality of rates corresponding to physical process variables, wherein the machine-learning model is trained using deterioration training data including a plurality of sustainment profiles inputs correlated to a plurality of rates;

receiving, by the at least a processor, user feedback relating to the plurality of rates outputs from the machine-learning model;

determining, by the at least a processor, an accuracy score for the machine-learning model based on the user feedback, wherein the accuracy score indicates to a number of retraining cycles required for the machine-learning model;

modifying, by the at least a processor, the deterioration training data based on the user feedback and the accuracy score to generate modified deterioration training data;

performing, by the at least a processor, event-based retraining of the machine-learning model using the modified deterioration training data based on the accuracy score, wherein retraining comprises performing a convergence test requiring a predetermined mean squared error;

determining, by the at least a processor, at least a relative advantage of a maintenance program as a function of an advantage predictor, wherein the advantage predictor is configured to receive the preservation need as input and output the maintenance program and the relative advantage;

displaying, by the at least a processor, through a graphical user interface, the at least a preservation need and relative advantage.

12. The method of claim 11, wherein receiving the sustainment profile comprises:

communicating with a user using a chatbot to collect required data; and populating the required data within the sustainment profile.

13. The method of claim 11, wherein the sustainment profile comprises at least an image and at least a geographic datum.

14. The method of claim 11, wherein receiving the sustainment profile comprises:

receiving at least a maintenance engagement datum; and determining a plurality of preservation classifications as a function of the plurality of images using an image classifier.

15. The method of claim 14, wherein the plurality of preservation classifications comprises a material type.

16. The method of claim 11, wherein the advantage predictor comprises a plurality of Markov chains, wherein each Markov chain comprises a plurality of states and transitions between the plurality of states.

17. The method of claim 11, further comprising determining, by the at least a processor, the maintenance program, wherein determining the maintenance program comprises retrieving the maintenance program as a function of the preservation need.

18. The method of claim 11, further comprising determining, by the at least a processor, the maintenance program, wherein determining the maintenance program comprises:

retrieving an initial maintenance program as a function of the preservation need; and adjusting the initial maintenance program as a function of a geographic datum and material type.

19. The method of claim 11, wherein:

the sustainment profile comprises a geographic datum; and the deterioration predictor is configured to receive the sustainment profile comprising the geographic datum as input and output the plurality of rates.

20. The method of claim 11, wherein:

the sustainment profile comprises a material type; and the deterioration predictor is configured to receive the sustainment profile comprising the material type as input and output the plurality of rates.

* * * * *